United States Patent
Churgin et al.

(10) Patent No.: US 12,159,647 B1
(45) Date of Patent: Dec. 3, 2024

(54) AUDIO PROCESSING USING ARTIFICIAL INTELLIGENCE FOR EARLY DISEASE IDENTIFICATION AND MEMBER ENGAGEMENT

(71) Applicant: CVS Pharmacy, Inc., Woonsocket, RI (US)

(72) Inventors: Matthew A. Churgin, Lansing, MI (US); Shashank Goswami, Jersey City, NJ (US); Sheikh Sadid Al Hasan, Weymouth, MA (US); Tien-Yu Hsin, Allston, MA (US); Prasad Telukuntla, Fremont, CA (US); Szu-Min Yu, Brooklyn, NY (US)

(73) Assignee: CVS Pharmacy, Inc., Woonsocket, RI (US)

( * ) Notice: Subject to any disclaimer, the term of this patent is extended or adjusted under 35 U.S.C. 154(b) by 434 days.

(21) Appl. No.: 17/570,136

(22) Filed: Jan. 6, 2022

Related U.S. Application Data

(60) Provisional application No. 63/134,564, filed on Jan. 6, 2021.

(51) Int. Cl.
| | |
|---|---|
| *G10L 15/18* | (2013.01) |
| *G06F 40/30* | (2020.01) |
| *G10L 15/20* | (2006.01) |
| *G10L 17/02* | (2013.01) |
| *G10L 17/14* | (2013.01) |
| *G10L 17/22* | (2013.01) |

(Continued)

(52) U.S. Cl.
CPC .............. *G10L 25/66* (2013.01); *G06F 40/30* (2020.01); *G10L 17/02* (2013.01); *G10L 17/14* (2013.01); *G10L 17/22* (2013.01)

(58) Field of Classification Search
CPC ......... G10L 25/66; G10L 17/02; G10L 17/14; G10L 17/22; G06F 40/30; G16H 50/20; A61B 5/4803; A61B 5/7267; A61B 5/7282; A61B 5/7465; H04M 3/5141
See application file for complete search history.

(56) References Cited

U.S. PATENT DOCUMENTS

| | | | |
|---|---|---|---|
| 10,735,585 B1 * | 8/2020 | Johnston | G06F 40/216 |
| 10,905,336 B1 * | 2/2021 | Moon | A61B 5/4504 |

(Continued)

OTHER PUBLICATIONS

Google Cloud, "Humana uses Google Cloud to reimagine the future of healthcare," YouTube video available at https://www.youtube.com/watch?v=NIUo5qP5AWc, posted Jul. 14, 2020, 3 pgs.

(Continued)

*Primary Examiner* — Jialong He
(74) *Attorney, Agent, or Firm* — Patent Law Works LLP

(57) ABSTRACT

A system and method for audio processing using artificial intelligence during a voice interaction is configured to improve early identification of disease and case management of a diagnosed member in a healthcare system. Audio data is generated from a voice call between customer service representative (CSR) of the healthcare system and then processed by one or more of a speech-to-text recognition model, a topic detection model, a speaker recognition model, a tone model, an intent identifier, and a sentiment identifier. Then the output of the audio processing is used to detect a condition and automatically perform an action.

24 Claims, 16 Drawing Sheets

(51) Int. Cl.
  *G10L 25/66* (2013.01)
  *G16H 80/00* (2018.01)

(56) References Cited

U.S. PATENT DOCUMENTS

| | | | | |
|---|---|---|---|---|
| 2006/0036619 | A1* | 2/2006 | Fuerst | G16H 50/80 |
| 2012/0265024 | A1* | 10/2012 | Shrivastav | G16H 50/30 |
| | | | | 600/300 |
| 2014/0257852 | A1* | 9/2014 | Walker | G06Q 10/10 |
| | | | | 705/3 |
| 2014/0337048 | A1* | 11/2014 | Brown | G06F 3/04886 |
| | | | | 705/2 |
| 2017/0251985 | A1* | 9/2017 | Howard | G16H 70/60 |
| 2018/0322254 | A1* | 11/2018 | Smurro | H04N 21/23614 |
| 2018/0366144 | A1* | 12/2018 | Ashoori | G16H 40/63 |
| 2019/0205733 | A1* | 7/2019 | Ghaeini | G06N 3/045 |
| 2019/0221312 | A1* | 7/2019 | Al Hasan | G06N 3/045 |
| 2019/0307388 | A1* | 10/2019 | Bobo | A61B 5/7282 |
| 2019/0313903 | A1* | 10/2019 | McKinnon | G16H 50/20 |
| 2019/0341152 | A1* | 11/2019 | Mellem | G16H 50/70 |
| 2019/0377796 | A1* | 12/2019 | Datla | G06F 40/30 |
| 2020/0037942 | A1* | 2/2020 | Howard | A61B 5/4088 |
| 2020/0050636 | A1* | 2/2020 | Datla | G06F 40/30 |
| 2020/0089767 | A1* | 3/2020 | Ni | G06Q 30/016 |
| 2020/0092419 | A1* | 3/2020 | Murali | G10L 25/24 |
| 2020/0111377 | A1* | 4/2020 | Truong | G09B 5/12 |
| 2020/0160351 | A1* | 5/2020 | Veggalam | H04M 3/5233 |
| 2020/0168343 | A1* | 5/2020 | Datla | G16H 80/00 |
| 2020/0219529 | A1* | 7/2020 | Gordon | G10L 15/183 |
| 2020/0365243 | A1* | 11/2020 | Swisher | G16H 80/00 |

OTHER PUBLICATIONS

Optum, Inc., "Next Best Talking Point," Optum white paper, Nov. 2019, 5 pgs.

* cited by examiner

300

(Case 1)

Conversation Tone Analysis Model (e.g., Historic Telephonic Visit for Individual ID 1916)

306

2019-08-25 08:30 PM Member Tone Trajectory
Topic: Clinical Trial

312

2019-12-11 11:59 AM Member Tone Trajectory
Topic: Case Management

AUDIO PROCESSING USING ARTIFICIAL INTELLIGENCE FOR EARLY DISEASE IDENTIFICATION AND MEMBER ENGAGEMENT

CROSS-REFERENCE TO RELATED APPLICATIONS

The present application claims priority, under 35 U.S.C. § 119, of U.S. Provisional Patent Application No. 63/134,564, filed Jan. 6, 2021, and entitled "Real-Time Topic and Tone Analyzer for Disease Early Identification and Member Engagement," which is incorporated by reference in its entirety.

TECHNICAL FIELD

The present disclosure generally relates to using artificial intelligence to process audio signals. More particularly, the present disclosure relates to audio processing and analysis of interaction recordings and text-based data generated from the interactions between a customer service representative (CSR) or case manager and a member of a healthcare system.

BACKGROUND

A diagnosed disease or condition of a member is not always instantaneously made known to service or care providers, such as a CSR or case manager of a healthcare system. Such a delay may hinder delivery of appropriate support (e.g., via assessment, education, coaching, and behavioral and social service referrals) due to postponement of outreach by the healthcare system to the member, potentially resulting in less than desirable outcomes for the member. Timely outreach by the healthcare system, such as by a CSR, may provide a benefit both to the member who may obtain a preferred support and intervention, and to the healthcare system that may greatly reduce costs based upon early treatment of the member.

Preparation for outreaches by the healthcare system may result in less than desirable interactions with the member when such interactions are performed with less than a desirable understanding of the member's condition and results of previous interactions between the member and the healthcare system.

SUMMARY

The present disclosure describes, among other things, various aspects for using artificial intelligence to perform audio processing in real-time of interactions between the customer service representative and the healthcare system. In general, one innovative aspect of the subject matter described in this disclosure may be embodied in a computer-implemented method, comprising receiving, using one or more processors, voice data from a call between a member and a customer service representative, generating, using the one or more processors, text data from the received voice data using artificial intelligence to apply a speech-to-text model, generating, using the one or more processors, a predicted topic using a topic detection model, detecting, using the one or more processors, a condition based on the text data and the predicted topic, and identifying an action to automatically perform based on the detected condition, the predicted topic, and the text data.

According to one innovative aspect of the subject matter described in this disclosure, a system comprises one or more processors, and a memory, the memory storing instructions, which when executed cause the one or more processors to receive voice data from a call between a member and a customer service representative, generate text data from the received voice data using artificial intelligence to apply a speech-to-text model, generate a predicted topic using a topic detection model, detect a condition based on the text data and the predicted topic; and identify an action to automatically perform based on the detected condition, the predicted topic, and the text data.

Other implementations of one or more of these aspects include corresponding systems, apparatus, and computer programs, configured to perform the actions of the methods, encoded on computer storage devices.

These and other implementations may each optionally include one or more of the following features. For instance, the operations further include where generating text data from the received voice data also includes applying a healthcare language model and a member profile model to the received voice data. Some examples may include where the topic detection model uses a deep learning model to process the voice data and the text data to generate the predicted topic, performing intent identification by applying a deep learning model to process the voice data and the text data to generate user intent, or performing sentiment identification by applying a deep learning model to process the voice data and the text data to generate user sentiment. Further implementations may include partitioning the voice data into one or more homogeneous segments according to speaker identity using a speaker recognition model, or performing speaker identification on the text data using a speaker recognition model. In one example, the operations further include generating tone data by applying a tone model to the text call data, or where the tone data is a tone trajectory of one or more of a first portion of the text call data for the member and a second portion of the text call data for the CSR.

In some instances, detecting the condition includes detection one or more of early disease risk detection, mental health conditions, neurodegenerative diseases, loss of train of thought, shift analysis, dementia, dementia proxy, fraudulent call or claim identification, social determinants of health barriers, and particular diseases.

For example, the features may include where the action automatically perform includes: one or more of automated healthcare customer service call summarization, extractive summarization by extracting key utterances which constitute important moments of the call, vector-quantized abstractive summary, automated call center performance review, customer profiling, intelligent routing, quantifying a churn risk, proactive outreach, next best action, call auditing reports for quality assurance, performance improvement, and data consistency checks, and customer service agent review. For example, the operations may also include receiving the voice call data in real-time; and identifying the action to automatically perform includes generating real-time prompts to the CSR to adjust a behavior of the CSR to be responsive to the member based on one or more of the text data, predicted topic and the detected condition.

It should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Figure 1A:
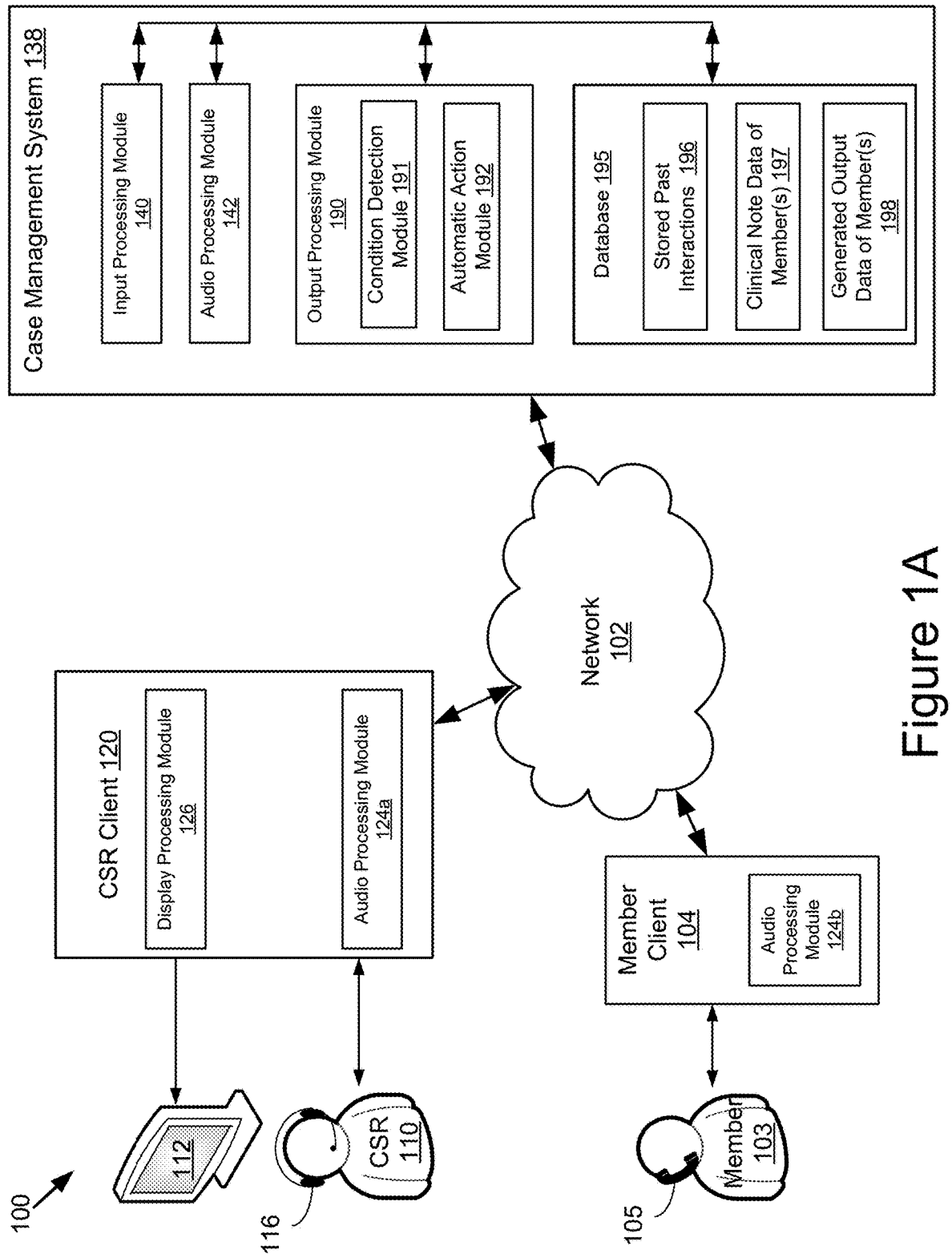
FIG. 1A illustrates a block diagram of a healthcare system in accordance with some implementations.

As set forth in detail below, the technology described herein provides an approach and a practical application to improve early identification of disease and case management efficacy. Currently, claim lag time prohibits a healthcare system to care for members that have received a disease diagnosis. In one aspect, real-time audio processing employing artificial intelligence is used to improve member engagements or interactions with a CSR. In particular, the output of real-time audio processing is provided to speech recognition and a keyword search on incoming member engagements or interactions with a CSR of the healthcare system. The sooner a member receives a diagnosis the sooner outreach by the healthcare system can begin and reduce any lag time from diagnosis to treatment.

Customer service representatives, such as case managers, may spend a significant amount of time preparing for an interaction or engagement with a diagnosed member. Further, due to random assignment of member cases and the complexity of a member information portal of the healthcare system, it may be difficult for customer service representatives to track or maintain a members' preferences as understood from a previous engagement or interaction with the healthcare system.

In one aspect, the disclosed method and system may use artificial intelligence to process audio signals and thereby improve the interaction between the CSR and the member. In a particular example, the system 100 may discover and visualize speakers, tone and topics from previous engagements or interactions (e.g., stored telephone calls) allowing the customer service representative to strategize for a next outreach engagement with the member. Such strategies may include directing the customer service representative to bring up more liked topics or similar topics and avoid topics that previously led to agitation of the member. Emotion or tone trajectories reflect the degree of emotion fluctuations by the member. Further, detection of emotional trajectories in the form of tone or emotion further allows the CSR to document, in the form of clinical note data, a member's change in mood due to the customer service representative's explanation or persuasiveness.

Furthermore, the various examples may generate a systemic member satisfaction metric in the form of an engagement score for a CSR based on various factors including pacing of questions and answers between the CSR and the member based at least in part on output data. Yet further, the system and methods described herein are readily scalable to other call centers in an organization or other teams that can utilize tabular data including tone or emotions in other analyses or as other model inputs.

Conventional approaches for diagnosing diseases or conditions of a member have relied on subjective evaluation by a CSR or other healthcare providers, resulting in delayed outreach or even missed outreach opportunities by a CSR or case manager of a healthcare system. Such a delay postpones outreach by the healthcare system to the member and may also result in less than desirable outcomes for the member. Objectively identified and timely outreach by the healthcare system, such as by a CSR, may provide a benefit both to the member who may obtain a preferred treatment and to the healthcare system that may reduce costs based upon early treatment of the member.

Further, conventional outreach preparations for outreach to a member by a healthcare system has relied upon subjective notes and any subjectively relayed or recollected impressions that may be recorded or passed to an outreach CSR. Such preparations are largely ineffective due to the subjective nature of member information identification, storing, and retrieving. Therefore, there is a need to objectively harvest diagnostic information from interactions between a member and a CSR in a healthcare system.

FIG. 1A illustrates a block diagram of a healthcare system 100, in accordance with some implementations. The system 100 may be configured to provide healthcare management improvements between a member (e.g., patient) and a CSR of a healthcare system. While the present disclosure will now be described in the context of interactions between a patient and a CSR of a healthcare system, it should be understood that the system may also be deployed in any other contexts in which audio signals are being passed between 2 actors and one actor needs to provide service to the other. The system 100 may include a network 102, one or more member clients 104, one or more CSR clients 120, and a case management system 138 configured to couple the member client 104, CSR client 120 and the case management system 138. The CSR client 120 and the case management system 138 may be co-located or may be separated to accommodate remote CSR operations.

The network 102 may communicatively couple the various components of the system 100. In some implementations, the network 102 is wired or wireless, and may have numerous different configurations. Furthermore, the network 102 may include a local area network (LAN), a wide area network (WAN) (e.g., the internet), and/or other interconnected data paths across which multiple devices may communicate. In some implementations, the network 102 may be a peer-to-peer network. The network 102 may also be coupled with portions of a telecommunications network for sending data using a variety of different communication protocols. In some implementations, the network 102 may include Bluetooth (or Bluetooth low energy) communication networks or a cellular communications network for sending and receiving data including via short messaging service (SMS), multimedia messaging service (MMS), hypertext transfer protocol (HTTP), direct data connection, wireless access point (WAP), email, etc. Although the example of FIG. 1A illustrates one network 102, in practice one or more networks can connect the entities of the system 100.

The system 100 may further include various components for accommodating a CSR 110. The CSR 110 may interface or interact with the CSR client 120 using a wired or wireless headset 116 which may include a speaker and a microphone. Further, the CSR 110 may also interact with the CSR client 120 using a display 112. In some implementations, the CSR client 120 may include one or more computing devices having data processing and communication capabilities including but not limited to a tablet computer, a desk top computer, a smart phone, etc. The CSR client 120 is coupled to communicate with other components of the system 100 via network 102. While the example of FIG. 1A depicts only a single CSR client 120, the system 100 may include any number CSR clients 120.

The system 100 may further include various components for accommodating a member 103. Member 103 may interface or interact with the member client 104 using a wired or wireless telephone 105 which may include a speaker and a microphone. It should be noted that the member client 104 may be incorporated into a conventional telephony network accessed by the member 103. In some implementations, the member client 104 may include one or more computing devices that have data processing and communication capabilities. The member client 104 is coupled to interact with the components of the system 100 via the network 102. While the example of FIG. 1A depicts only a single member client 104, the system 100 may include any number member clients 104.

The CSR client 120, the member client 104, and the case management system 138 interact with complementary processes or modules for accommodating the exchange of audio and video information. For example, CSR client 120 may receive audio from a CSR 110 and process the audio with audio processing module 124a. The audio may thereafter be exchanged with audio processing module 142 located in the case management system 138. Similarly, member client 104 may receive audio from a member 103 and process the audio with audio processing module 124b. The audio may thereafter be exchanged with audio processing module 142 located in the case management system 138. Further, image information may also be displayed to the CSR 110 using a display 112 with the information to be displayed being at display processing module 126, as received from output processing module 190 located in the case management system 138. While the present disclosure will be described in the context of primarily audio processing, the principle of the present disclosure could also be applied similarly to video processing.

The case management system 138 includes an input processing module 140, an audio processing module 142, an output processing module 190, and a database 195.

The input processing module 140 may provide an interface for servicing the CSR client 120 and the member client 104. Specifically, the input processing module 140 may receive audio from one or both of the audio processing module 124a of the CSR client 120, and the audio processing module 124b of the member client 104. It should be understood that the input processing module 140 may receive raw audio signals, partially processed audio signals, or audio signals that have been processed into another format from the CSR client 120 or the member client 104. The input processing module 140 may also receive other data and information from the CSR client 120, the member client 104 and other computing or data sources (not shown).

The audio processing module 142 is configured to receive and process the received voice call data, raw audio signals. Some implementations of the audio processing module 142 will be described in more detail below with reference to FIGS. 1B-1G. The audio processing module 142 advantageously processes the input audio signals using artificial intelligence or machine learning. For example, the audio processing module 142 uses artificial intelligence or machine learning to perform one or more of speech-to-text recognition, topic detection, speaker recognition, tone identification, intent identification and sentiment identification. While the audio processing module 142 will be described below using specific machine learning or artificial intelligence constructs, it should be understood that other forms of machine learning and artificial intelligence other than those specified below could be used including, but not limited to, geometric systems like nearest neighbors and support vector machines, probabilistic systems, evolutionary systems like genetic algorithms, decision trees, neural networks, convolutional neural networks, associated with decision trees, Bayesian inference, random forests, boosting, logistic regression, faceted navigation, query refinement, query expansion, singular value decomposition, Markov chain models, and the like. Moreover, the audio processing module 142 or its components may use supervised learning, semi-supervised learning, or unsupervised learning for building, training and re-training the machine learning systems based on the type of data available and the particular machine learning technology used for implementation. The audio processing module 142 has been described above as being coupled to receive the raw audio and other audio signals from the input processing module 140. In other implementations, the audio processing module 142 may receive the signals directly from the CSR client 120 or the member client 104. It should be understood that while the audio processing will be described below as being performed entirely by the audio processing module 142, in some implementations, some of the processing described below as being done by the audio processing module 142 can be performed by either the audio processing module 124*a* of the CSR client 120 or the audio processing module 124*b* of the member client 104 in alternate configurations.

The output processing module 190 may be configured to generate output data at least in part from the output of the audio processing module 142. The output processing module is coupled to receive data and signals from the input processing module and 40 and the audio processing module 142. The output processing module is also coupled to provide its output to the CSR client 120 and/or the member client 104. In some implementations, the output processing module includes a condition detection module 191 and an automatic action module 192. The output data may be presented to the CSR 110 in a display 112 via the display processing module 126 or in the form of audio via the audio processing module 124*a*. In some implementations, the output data may include best talking points for the CSR to use in a subsequent engagement with the member.

The condition detection module 191 may be steps, processes, functionalities, software executable by a processor, or a device including routines for detecting member 103 condition, CSR 110 condition, or other conditions. For example, the condition detection module 191 may detect any condition that is informative in determining next actions in the care continuum. Some example conditions that the condition detection module 191 may detect are described below. For example, the condition detection module 191 may perform early disease risk detection. More specifically, the condition detection module 191 may determine different mental health conditions (e.g., depression, suicide risk, etc.) and signal the automatic action module 192 for proactive outreach. Similarly, the condition detection module 191 may detect Alzheimer's or other neurodegenerative diseases. Call data such as loss of train of thought, topic trends, shift analysis, etc. may be detected by the condition detection module 191. Likewise, a care manager can ask a patient to describe a clock, and the condition detection module 191 can perform text to image generation from their description. The degree of confidence in classifying the image as a clock can be used to diagnose dementia. Similarly, the condition detection module 191 can parse a syntax tree of a member's answers to determine whether a coherence quantification can be regarded as a dementia proxy. The condition detection module 191 can also be used to detect fraudulent calls or claims. The condition detection module 191 can also be used to collect other information and detect social determinants of health barriers. In some implementations, the condition detection module 191 can also detect nonverbal signals for the detection of particular diseases (e.g., coughing, stuttering, or other audible non-linguistic cues indicating a smaller set of diseases) using Hidden Unit Bidirectional Encoder Representations from Transformers (HuBERT) or other transformer-based audio processing model. In some implementations, the condition detection module 191 can detect the likelihood of a member nonpreferred action using a predictive model. Likewise, the condition detection module 191 can identify members at risk of taking non-preferred health-related actions using a predictive model. In response to identification of members at risk of taking non-preferred health-related actions, that identification is used as a trigger for the automatic action module 192 to initiate a behavior change outreach campaign.

The automatic action module 192 may be steps, processes, functionalities, software executable by a processor, or a device including routines for performing an action automatically based on the conditions detected. The automatic action module 192 is coupled to the condition detection module 191 to receive signals identifying the conditions that the condition detection module 191 has identified. Some example actions that the automatic action module 192 may perform are described below. For example, the automatic action module 192 may perform automated healthcare customer service call summarization. This may include extractive summarization in which the customer service call is summarized by extracting the key utterances which constitute the most important moments of the call. This may also include a vector-quantized abstractive summary in which the automatic action module 192 leverages a novel end-to-end deep learning architecture to output natural language summaries of healthcare customer service call audio. In some implementations, the automatic action module 192 performs an automated call center performance review. Additionally, the automatic action module 192 may perform healthcare customer profiling in which a customer personality and preference profile are quantified and used to match the member with a like-minded customer service agent (e.g., intelligent routing), or quantifying a churn risk and performing proactive outreach using text and tone analysis. In some implementations, the automatic action module 192 processes the information from the CSR/member call including call conversation information as well as other information about the member and/or the CSR to determine a next best action (NBA) to initiate. For example, based on the call conversation data, a particular campaign can be initiated to increase the engagement of the member. In some implementations, the call conversation data and detected conditions can be leveraged to predict member sentiment which in turn can be fed as a feature into a customer churn model and a customer lifetime value model to determine those parameters. In some implementations, the automatic action module 192 can also automatically generate call auditing reports for quality assurance, performance improvement, and data consistency checks. In some implementations, the automated action module 192 can initiate a customer service agent review based on detected conditions.

The database 195 may include a data storage that includes one or more non-transitory computer-readable media for storing the data. In some implementations, the database 195 may be incorporated with the memory 916 (See FIG. 9) or may be distinct therefrom. In some implementations, the database 195 may be coupled via the cloud or external to the server 900 (See FIG. 9) and coupled via communication unit 912. In some implementations, the database 195 may include a database management system (DBMS). For example, the DBMS could include a structured query language (SQL) DBMS, a NoSQL DBMS, various combinations thereof, etc. In some implementations, the DBMS may store data in multi-dimensional tables comprised of rows and columns, and manipulate, e.g., insert, query, update and/or delete, rows of data using programmatic operations. While the database 195 is shown in FIG. 1A as being part of the case management system 138, it should be understood that in some implementations the database 195 may be directly coupled to the network to 102 and not included in the case management system 138. The case management system 138 would access the database 195 via the network 102 in such an implementation. The database 195 may include stored past interactions, for example, historic phone recordings of member(s) or CSRs 196, clinical note data 197 relating to members as recorded by a CSR or other entity in the healthcare system, and generated output data 198 of members. In some implementations, the stored past interactions between the CSR in the member are retrieved and used as the voice called data. In some implementations, the generated output data may include an engagement score for the CSR based on a pace of questions and answers between the CSR and the member based at least in part on the output data from the output processing module 190.

Figure 1B:
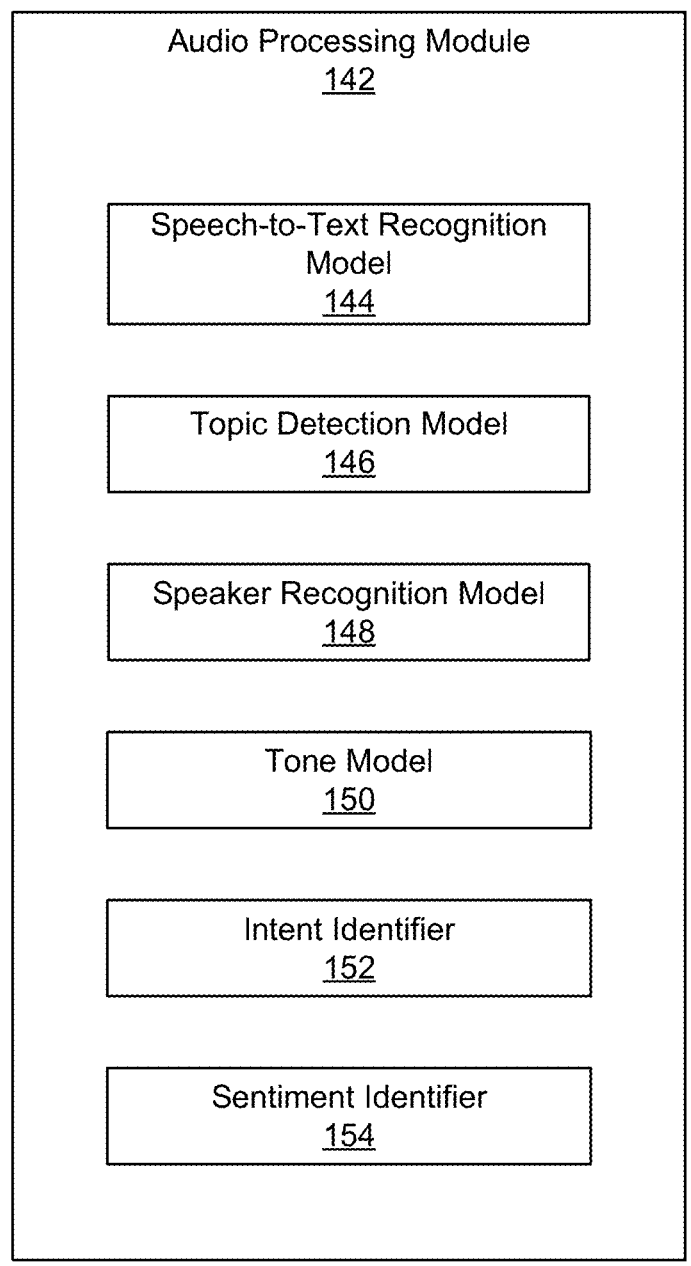
FIG. 1B illustrates a block diagram of an audio processing module in accordance with some implementations.

Referring now to FIG. 1B, the audio processing module 142 is shown and will be described in more detail. In some implementations, the audio processing module 142 may include a speech-to-text recognition model 144, a topic detection model 146, a speaker recognition model 148, a tone model 150, an intent identifier 152, and a sentiment identifier 154. The various modules or components 144, 146, 148, 150, 152, and 154 may be configured to include various models including machine learning models. The audio processing module 142 is particularly advantageous in some implementations because it is able to provide real-time guidance to a care manager to improve a member experience and also to identify missing audit elements. In some implementations, the various models or components 144, 146, 148, 150, 152, and 154 described below may provide a deep learning architecture for various feature extraction. For example, the subject models or components 144, 146, 148, 150, 152, and 154 provide a deep learning architecture that provides for automated feature extraction for several tasks including, but not limited to, speech-to-text recognition, topic detection, speaker recognition, tone detection, intent identification and sentiment identification.

Additionally, it should be understood that the audio processing module 142 may also include natural language processing (NLP) capabilities even though not shown specifically in FIG. 1B. For example, based on phonetic speech-to-text output, a classifier based on n-character grams may be used to predict whether the language spoken is English or Spanish. It could also be extended to any number of other languages. For example, the first three member utterances are used to create a 4-character gram feature space. The feature space can be truncated to reduce it dimensionally by singular value decomposition (SVD). For example, components corresponding to 95% of the original feature spaces variation as the input to a traditional classifier to predict the language (binary or multiclass). The truncated SVD can be used to identify and label the language.

Figure 1C:
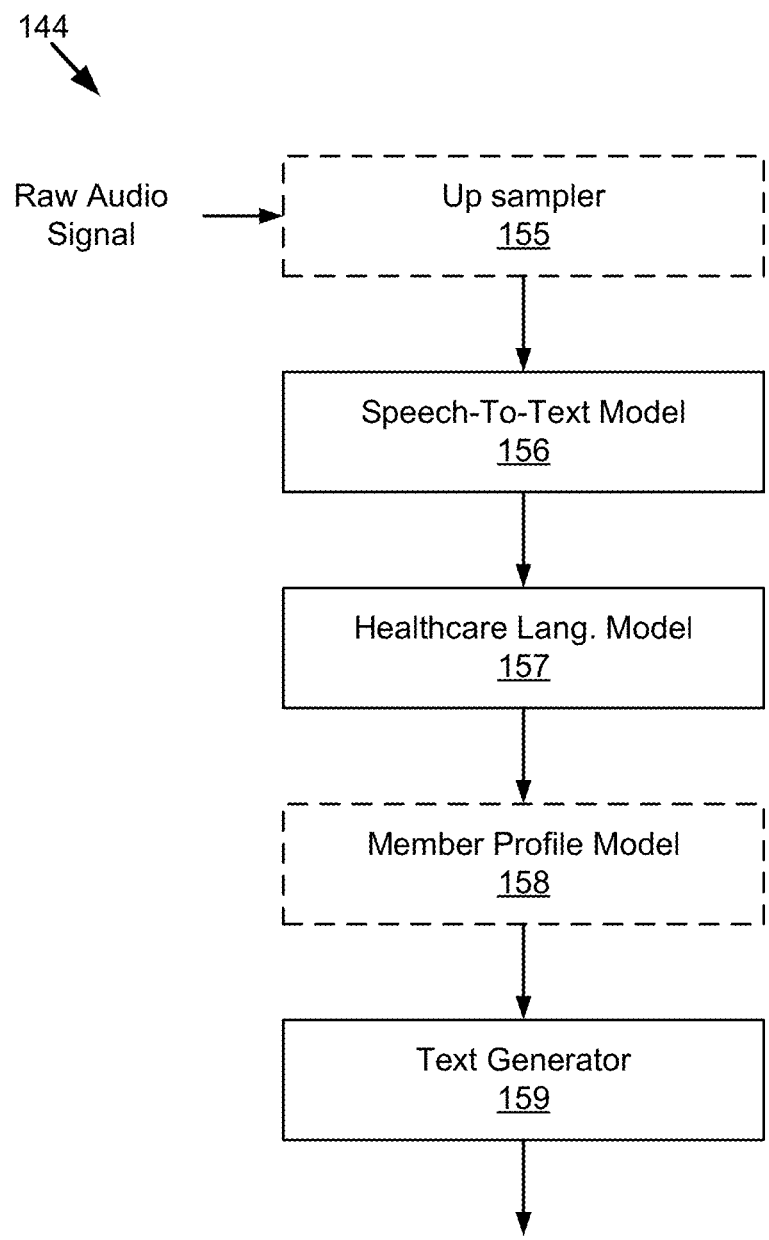
FIG. 1C illustrates a block diagram of a speech-to-text recognition model in accordance with some implementations.

Referring now also to FIG. 1C, the speech-to-text recognition model 144 will be described in more detail. FIG. 1C illustrates the configuration of components comprising the speech-to-text recognition model 144 as well as the process steps of a method for generating text data from a raw audio input signal. In some implementations, the speech-to-text recognition model 144 may be configured to receive a raw voice signal or data and generate text call data using a speech-to-text model 156. The speech-to-text recognition model 144 may be steps, processes, functionalities, software executable by a processor, or a device including routines for generating text from an input audio signal. In some implementations, the speech-to-text recognition module 144 comprises an up sampler 155, a speech-to-text model 156, a healthcare language model 157, a member profile model 158, and a text generator 159.

In some implementations, the up sampler 155 receives a raw audio signal including speech. For example, the raw input audio signal may be an 8 kHz signal. The up sampler 155 up samples the raw input audio signal to generate a 16 kHz signal. In some implementations, deep learning can be used to up sample the low quality 8 kHz audio signal to 16 kHz to improve sound quality and increase fidelity for enhanced speech-to-text performance. In particular, deep convolutional neural networks can be used to learn key features of signal and noise with a customized kernel function to filter out noises with max-pooling techniques for improved sound quality. The up sampler 155 is depicted in FIG. 1C with dashed lines indicating that it is optional, and that in some implementations, the raw audio signal may be provided directly to the speech-to-text asked model 156.

The speech-to-text model 156 is coupled to receive the raw audio signal or an up sampled version of it from the up sampler 155. In some implementations, the speech-to-text model 156 is a deep learning model for converting speech-to-text that has been fine-tuned based on healthcare customer service call data. For example, the speech-to-text model 156 may be trained on past audio signals from past calls between CSRs 110 and members 103. The speech-to-text model 156 processes the input audio signal and generates speech-to-text outputs.

The healthcare language model 157 is coupled to the speech-to-text model 156 to receive the raw speech-to-text outputs. In some implementations, the healthcare language model 157 applies a healthcare domain language model to raw speech-to-text outputs to correct phonetic errors in speech-to-text and enable improved recognition of uncommon but high information density tokens, such as medical terminologies. The corrected or augmented raw speech-to-text outputs are then output by the healthcare language model 157.

The member profile model 158 is coupled to the healthcare language model 157 to receive the corrected or augmented raw speech-to-text output. In some implementations, the member profile model 158 includes a customized or custom-trained model for the member. The member profile model 158 may be personalized for the particular member by including information about that user to increase the accuracy of recognition and conversion to text. The member profile model 158 is adapted to the member based on known demographics (e.g., geographical location, ethnicity, gender etc.) from databases such as database 198 or other information about the member. The member profile model 158 is applied to the corrected or augmented raw speech-to-text output to further refine the generated text and generate a refined output. The member profile model 158 is depicted in FIG. 1C with dashed lines indicating that it is optional, and that in some implementations, the corrected or augmented raw speech-to-text output may be provided directly from the healthcare language model 157 to the text generator 159.

The text generator 159 is coupled to receive either the refined output from the member profile model 158 or the corrected or augmented raw speech-to-text output from the healthcare language model 157. The text generator 159 receives either input and generates text strings that are segmented and spaced based on the input audio signals.

Figure 1D:
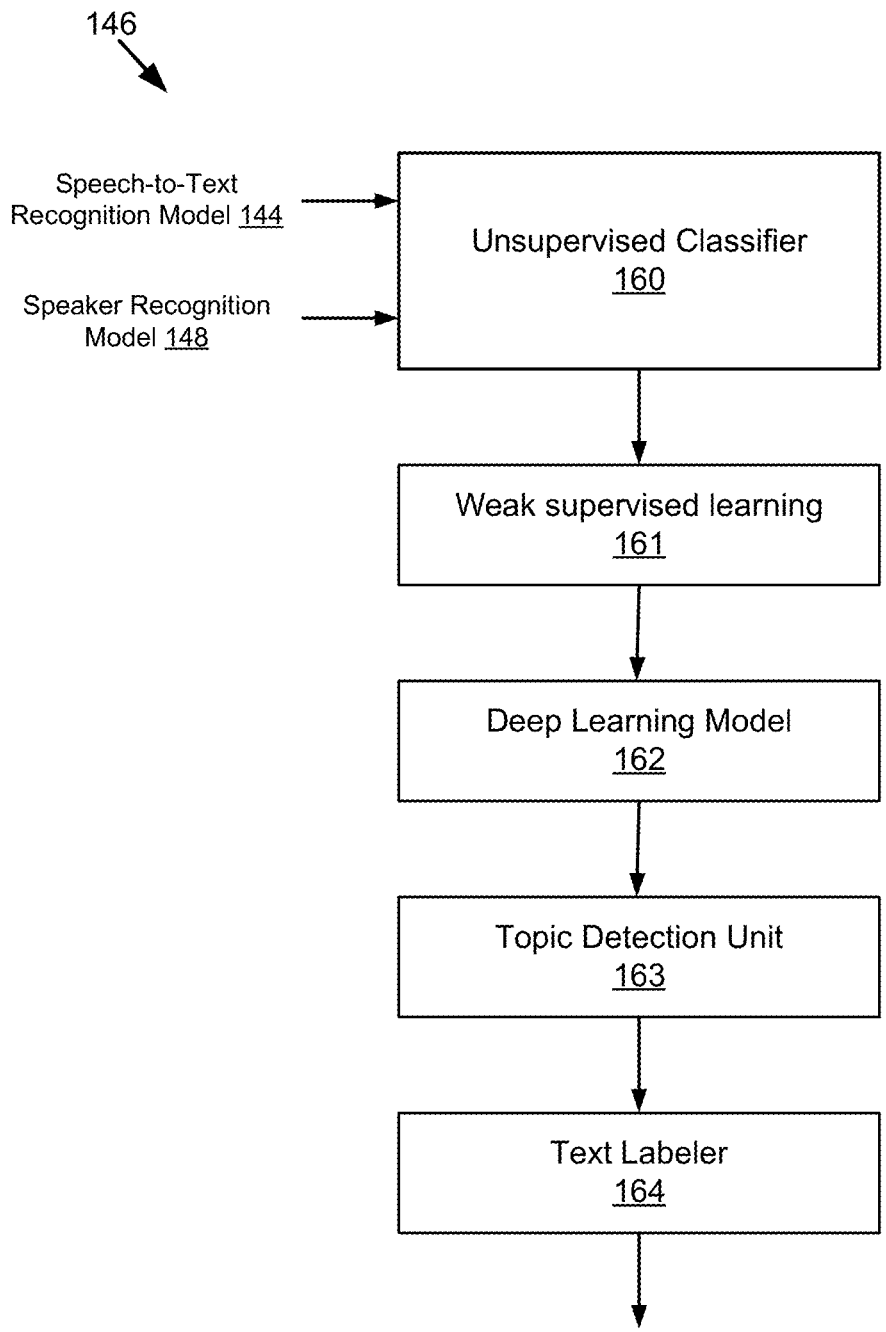
FIG. 1D illustrates a block diagram of a topic detection model in accordance with some implementations.

Referring now also to FIG. 1D, the topic detection model 146 will be described in more detail. In some implementations, FIG. 1D illustrates the configuration of components comprising the topic detection model 146 as well as the process steps of a method for identifying a topic (predicted topic) of the interaction and labeling the text with the topic (predicted topic). In some implementations, the topic detection model 146 is coupled to receive as input the output of the speech-to-text recognition model 144 and the output of the speaker recognition model 148. The topic detection module 146 may also receive information and data from other sources such as the database 195. The topic detection 146 may be configured to receive text call data from the speech-to-text recognition model 144 and clinical note data 197 from database 195, and generate topic data based on a topic model. The topic detection model 146 may be steps, processes, functionalities, software executable by a processor, or a device including routines for identifying the topic(s)

from the generated text and the identified speaker. In some implementations, the topic detection model 146 comprises: an unsupervised classifier 160, a weak supervised learning model 161, a deep learning model 162, topic detection unit 163, and a text labeler 164.

The unsupervised classifier 160 is coupled to receive the text from the speech-to-text recognition module 144 and the information from the speaker recognition module 148. The unsupervised classifier 160 processes this information to label each segment with a call specific topic. In some implementations, the unsupervised classifier 160 is an unsupervised custom classifier for multi-classes. The unsupervised classifier 160 labels each segment of a call with a specific topic. For example, a custom set of labels including terms such as "primary care," "specialist," "benefits," "prior authorization," "prescription," "status," "scheduling," etc. It should be understood that this list of labels is just merely a small set of examples and that a much larger set of custom labels may be used by the unsupervised classifier 160. The unsupervised classifier 160 outputs the labeled segments for further processing.

The weak supervised learning model 161 is coupled to receive the labeled segments from the unsupervised classifier 160. The weak supervised learning model 161 is used to create topic labels for each utterance based on heuristics. The weak supervised learning model 161 is applied to the labeled segments from the unsupervised classifier 160 to produce segmented text strings that have topic labels associated with them. The weak supervised learning model 161 outputs this information for further processing.

The output of the weak supervised learning model 161 is input to the deep learning model 162. The deep learning model 162 is used to embed each utterance into a dense vector. In some implementations, the deep learning model 162 uses a character-based Bidirectional Encoder Representation from Transformers (BERT). The deep learning model 162 generates a dense vector which is output to the topic detection unit 163.

The topic detection unit 163 receives the dense vector from the deep learning model 162. The topic detection unit 163 receives a set of features and determines a predicted topic based on the input features. For example, the topic detection unit 163 may be a label classifier. In some implementations, the dense vector from the deep learning model 162 is used as feature inputs into a multi-label classifier to predict the utterance topics. The topics, for example, "primary care," "specialist," "benefits," "prior authorization," "prescription," "status," "scheduling," etc. may be detected in the text input may be identified by the topic detection unit 163. The output of the topic detection unit 163 is provided to the text labeler 164. The text labeler 164 labels the text input based on the topics identified and the text strings to which they are associated.

Figure 1E:
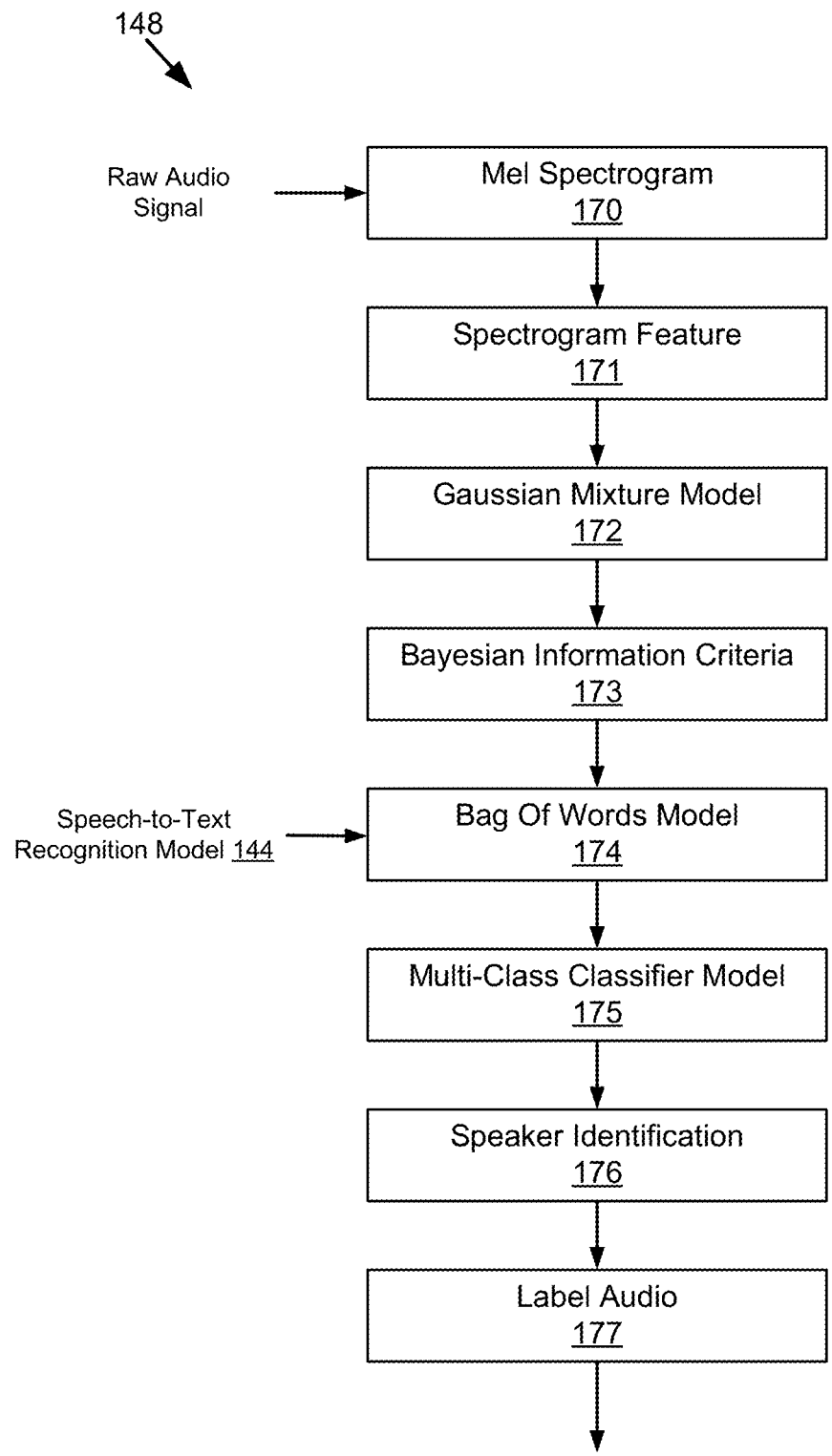
FIG. 1E illustrates a block diagram of a speaker recognition model in accordance with some implementations.

Referring now to FIG. 1E, the speaker recognition model 148 will be described in more detail. In some implementations, FIG. 1E illustrates the configuration of components comprising speaker recognition model 148 as well as the process steps of a method for speaker diarization and identification. The speaker recognition model 148 receives a raw audio signal and identifies who is speaking at a given time (speaker diarization) and who the speaker is (speaker identification). In some implementations, the speaker recognition model 148 may be configured to receive text call data from the speech-to-text recognition model 144 and allocate a first portion of the text call data to the member 103 and a second portion of the text call data to the CSR 110 based on a speaker recognition model. In some implementations, the speaker recognition model 148 includes: a mel spectrogram 170, a spectrogram feature 171, a Gaussian mixture model 172, Bayesian information criteria 173, a bag of words model 174, a multi-class classifier model 175, a speaker identification 176, and label audio 177. For example, the components 170, 171, 172, and 173 perform speaker diarization including partitioning the input audio stream into homogeneous segments according to speaker identity. In some implementations, these components 170, 171, 172, and 173 perform unsupervised clustering of audio spectrum data to identify unique speakers in the audio clip. In comparison, the components 174, 175, 176, and 177 are used for speaker identification, identifying and distinguishing speakers based on the unique characteristics of the audio the output. More specifically, the components 174, 175, 176, and 177 are a custom classifier to predict a speaker label (e.g., identify the person speaking-either the member 103 or the CSR 110) from a healthcare customer service call or a care management outreach call.

As shown in FIG. 1E, the speaker recognition model 148 receives a raw audio signal which is provided to the mel spectrogram 170. The mel spectrogram 170 is computed for short time windows for the input raw audio signal. The mel spectrogram 170 generates an acoustic time-frequency representation of the raw input audio signal. The Mel spectrogram 170 is coupled to provide this representation to the spectrogram feature 171.

The spectrogram feature 171 receives the acoustic time-frequency representations from the Mel spectrogram 170 and extracts spectrogram features. The features can be used for classification. These spectrogram feature 171 is coupled to provide these features to the Gaussian mixture model 172.

The Gaussian mixture model 172 receives the features from the spectrogram feature 171 and performs modeling on the spectrogram features to cluster time points to determine which time points belong to a given speaker. Since the speaker recognition module 148 does not know a priori how many speakers will be present on the raw audio signal input, in some implementations, the Gaussian mixture model 172 is run on multiple clusters of time representations. For example, the Gaussian mixture model 172 may not know how many speakers there are on the given audio file because the member may be transferred once or multiple times between different CSRs. In some implementations, the Gaussian mixture model 172 performs the Gaussian mixture model algorithm with multiple expected clusters, for example as many as 10. The Gaussian mixture model 172 outputs the probabilities of each of the features belongs to a given cluster. The output of the Gaussian mixture model 172 is provided to the Bayesian information criteria 173.

The Bayesian information criteria 173 is coupled to receive the probabilities output by the Gaussian mixture model 172. The Bayesian information criteria 173 determines the minimum number of clusters. In other words, the Bayesian information criteria 173 are used to determine which number of clusters is appropriate for the given audio file. The clustering results are provided by the Bayesian information criteria 173 to the bag of words model 174.

The bag of words model 174 is also coupled to receive the text strings output by the speech-to-text recognition module 144. The bag of words model 174 represents text as a multi-set of its words disregarding grammar or word order but including multiplicity. In some implementations, the bag of words model 174 also uses a term frequency-inverse document frequency (TF-IDF) and BERT embeddings as features to predict whether the speaker is a member 103, a CSR 110, a care manager or IVR. The bag of words model 174 generates features that can be used for additional speaker identification processing.

The multi-class classifier model 175 is coupled to receive the features from the bag of words model 174. The multi-class classifier model 175 processes the features received from the bag of words model 174 and uses them to predict the appropriate label for each speaker in the audio. In some implementations, the multi-class classifier model 175 may be for example logistic regression, random forest, or a Scalable, Portable and Distributed Gradient Boosting. The multi-class classifier 175 is coupled to output predicted labels.

The speaker identification 176 is coupled to receive the output of the multi-class classifier model 175. The speaker identification 176 is used to identify each speaker in the audio segment. The speaker identification 176 identifies the speaker as one from the one or more CSRs, one or more care managers, and a member. The speaker identification 176 cooperates with the label audio 177 to label audio based on each speaker that is identified.

The tone model 150 may be configured to receive text call data (the raw audio signal) and/or the output of the speech-to-text recognition model 144 and generate tone data based on a tone model. The tone model 150 may process the audio signal in a manner similar to that described above with reference to FIGS. 1C and 1E above. However, the models are modified to detect, identify, and classify tone. Example tone types will be described in more detail below with reference to FIG. 5.

Figure 1F:
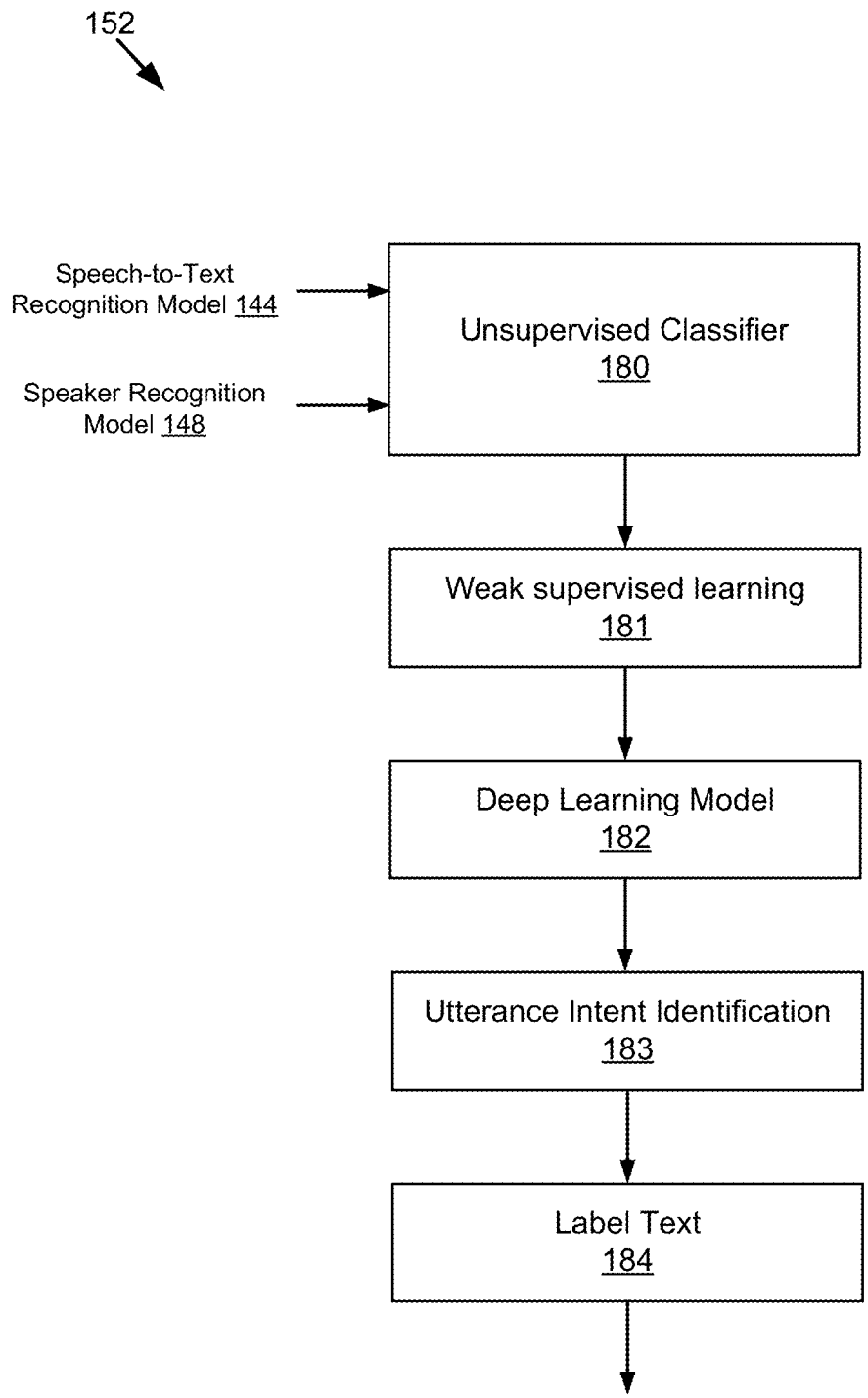
FIG. 1F illustrates a block diagram of an intent identifier in accordance with some implementations.

Referring now to FIG. 1F, the intent identifier 152 in accordance with some implementations will be described in more detail. In some implementations, FIG. 1F illustrates the configuration of components comprising the intent identifier 152 as well as the process steps of a method for determining speaker intent. In some implementations, the intent identifier 152 comprises: an unsupervised classifier 180, a weak supervised learning 181, a deep learning model 182, utterance intent identification 183 and a label text 184.

The unsupervised classifier 180 is coupled to receive the output of the speech-to-text recognition module 144 and the speaker recognition model 148. The unsupervised classifier 180 is used to label each segment of a call with a specific intent. The unsupervised classifier 180 has a set of pre-defined specific intents. For example, some specifics intents may include "greeting," "member question," "representative answer," "follow-up question," etc. The unsupervised classifier 180 processes the received inputs and outputs the labels for each segment.

The weak supervised learning 181 is coupled to receive the labels for each segment. The weak supervised learning 181 then automatically creates intent labels for each utterance based on heuristics. The weak supervised learning 181 outputs these automatically created intent labels to the deep learning model 182.

The deep learning model 182 is coupled to receive the automatically created intent labels from the weak supervised learning 181, and to embed each utterance into a dense vector. In some implementations, the deep learning model 182 is a character-based BERT deep learning model. The deep learning model 182 outputs the dense vector.

The utterance intent identification 183 receives the dense vector from the deep learning model 182. The utterance intent identification 183 uses the dense vector to predict the utterance intent. In some implementations, the utterance intent identification 183 is a multi-class classifier and the dense vector is used as the feature inputs to the multi-class classifier. For example, the classes may include greeting, member question, follow-up question, representative answer, etc. The utterance intent is predicted as to which of these classes is likely to be. The identified class is an output by the utterance intent identification 183 to the label text 184.

The label text 184 receives the identified class from the utterance intent identification 183 and labels the associated text with the class that it identified by utterance intent and indication 183.

Figure 1G:
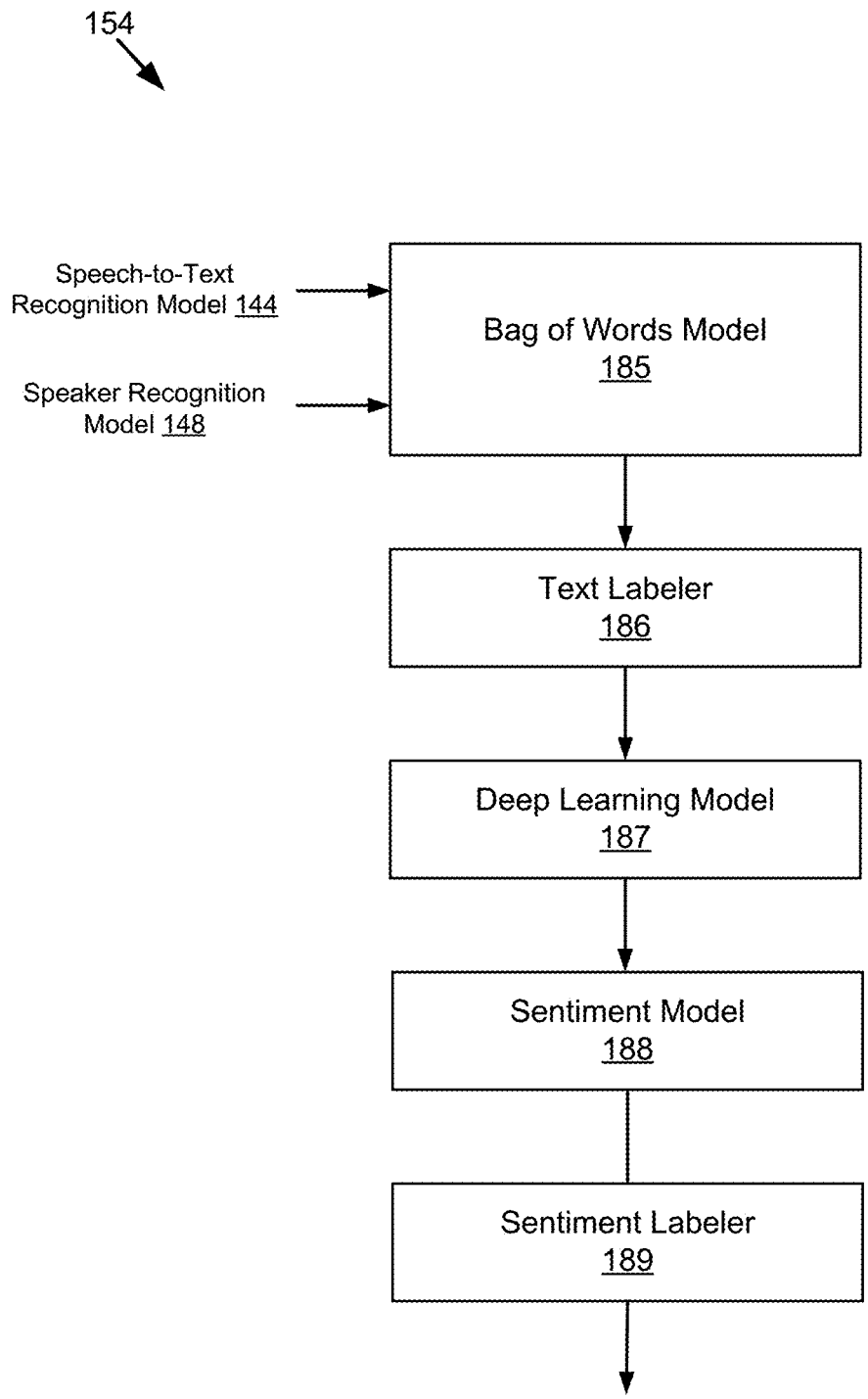
FIG. 1G illustrates a block diagram of a sentiment identifier in accordance with some implementations.

Referring now to FIG. 1G, the sentiment identifier 154 in accordance with some implementations will be described in more detail. In some implementations, FIG. 1G illustrates the configuration of components comprising the sentiment identifier 154 as well as the process steps of a method for determining speaker sentiment. In some implementations, the sentiment identifier 154 comprises: a bag of words model 185, a text labeler 186, a deep learning model 187, a sentiment model 188 and a sentiment labeler 189. In some implementations, the sentiment identifier 154 uses the output of the tone model 150 to determine sentiment in real time. In other implementations, the sentiment identifier 154 uses the output of the speech-to-text recognition model 144 to determine overall call sentiment.

As shown in FIG. 1G, the bag words model 185 receives the output of the speech-to-text recognition model 144 and the speaker recognition module 148. In some implementations, the bag of words model 185 also uses a term frequency-inverse document frequency (TF-IDF) and a character BERT to generate features to predict the speaker sentiment. The bag of words model 185 is used to create a TF-IDF vector. The bag of words model 185 is coupled to provide the TF-IDF vector to the text labeler 186.

The text labeler 186 is coupled to receive the TF-IDF vector from the bag of words model 185. In some implementations, the text labeler 186 uses a natural language processing model. For example, the text labeler 186 may be performed with a TextBlob library. In some implementations, the text labeler 186 assigns a sentiment of positive, negative or neutral to each utterance. The label output of the text labeler 186 is provided to the deep learning model 187.

The deep learning model 187 is coupled to receive the sentiment labels applied by the text labeler 186 and the TF-IDF vector from the bag of words model 185. The deep learning model 187 generates a dense vector using the character BERT. The output of the deep learning model 187 is provided to the sentiment model 188.

The sentiment model 188 receives the output of the deep learning model 187. The sentiment model 188 receives sentiment at the utterance level and produces a sentiment label for the entire call. In some implementations, the sentiment module 188 receives the TF-IDF vectors and uses them to generate a label for the final call. For example, the sentiment model 188 may weight each utterance by the sum of its TF-IDF vector (a measure of information content on the utterance) to calculate the weighted sentiment for the entire call. This weighted sentiment is then output by the sentiment module 188 to the sentiment labeler 189.

The sentiment labeler 189 is coupled to receive the weighted sentiment from the sentiment module 188. The sentiment labeler 189 labels the entire call with the sentiment value received from the sentiment model.

It should be understood that in some implementations, the sentiment identifier 154 may also receive tone features from the tone model 150. In such an implementation, the sentiment identifier 154 combines the text (TF-IDF) features with aggregate tone features to create a more powerful and accurate sentiment analysis model. Such an implementation of the sentiment model 154 integrates the words spoken in the tone in which they are spoken to predict the speaker sentiment.

Figure 2:
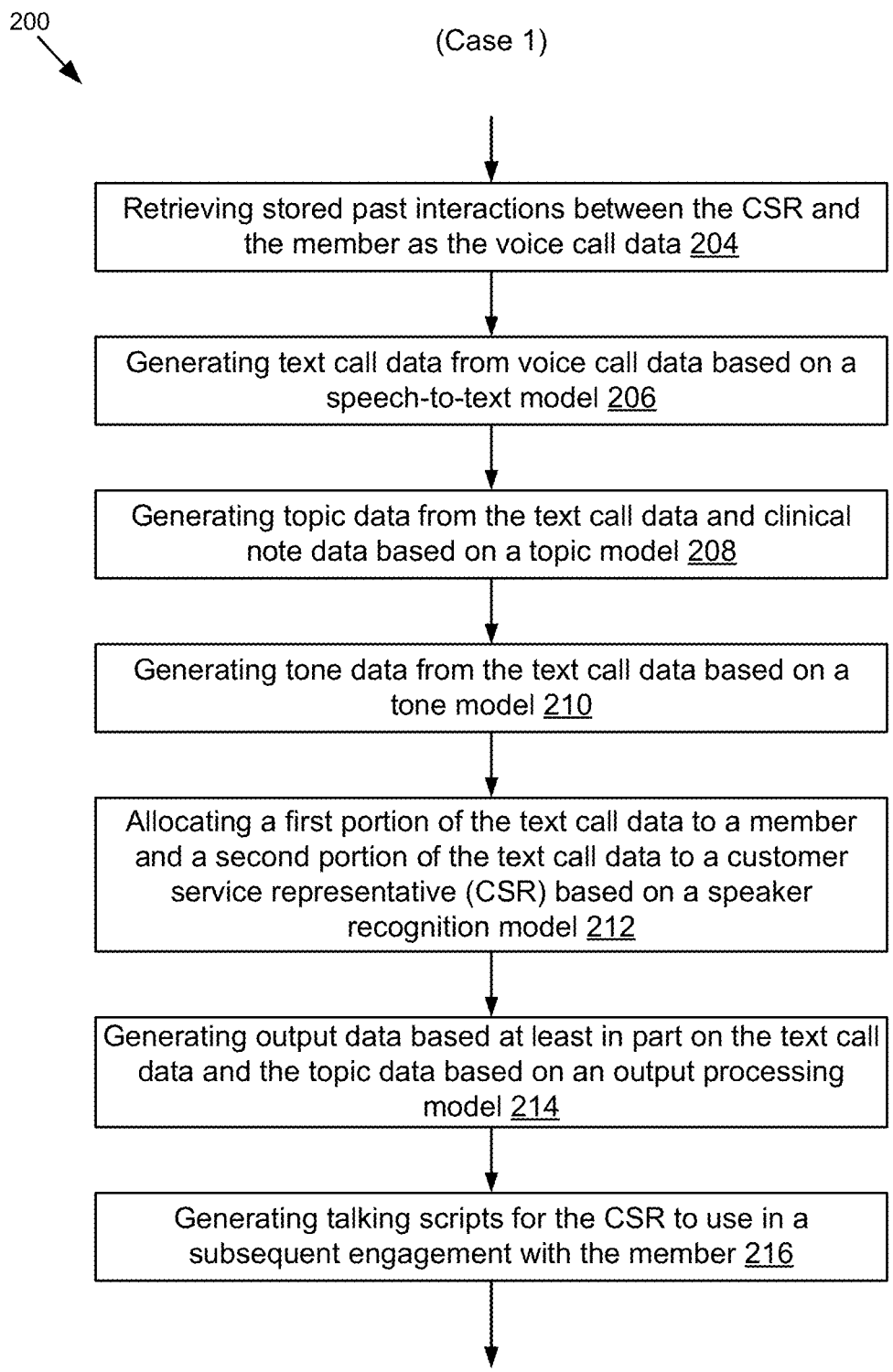
FIG. 2 illustrates a flow diagram of a first example method for improving case management of a member in a healthcare system in accordance with some implementations.

FIG. 2 illustrates a flow diagram of a method 200 for analyzing a member interaction with the customer service representative of the healthcare system. The process for evaluating an interaction between a customer service representative and a member begins at block 204 by retrieving as the voice call data the stored past interactions between the CSR and the member. The stored past interactions may provide a basis for analyzing past interactions to accommodate improved future interactions between the CSR and the member.

In a block 206, the voice call data may be processed by a speech-to-text recognition model 144 to generate text call data. The speech-to-text recognition model 144 may convert audio data into readable text call data or other computer-processable data.

In a block 208, the text call data may be processed to generate topic data based on the topic detection model 146. In one aspect, clinical note data may be used to augment the text call data for the generation of the topic data. The topic data may be in the form of a diagnosis or symptoms associated with a known disease or a concern of the member as expressed either in real-time or from stored past interactions between a CSR and a member.

In a block 210, the text call data may be used to generate tone data based on a tone model 150. The tone data is a representation of the sympathetic nature of the conversation between the CSR and the member. The various tones may be categorized, for example, as one or more of various feelings including anger, calmness, fear, positivity, and sadness. These various feelings may be generated based on a tone model.

In a block 212, the text call data may be apportioned into various portions generated by each of the speakers in the interaction. For example, the first portion of the text call data may be allocated to a member and a second portion of the text call data may be allocated to a CSR based on a speaker recognition model. Separation of the various portions of the text call data may enable separate analysis of the portions of the conversation.

In a block 214, output data may be generated, based at least in part on the text call data and the topic data based on an output processing module 190.

In another aspect at a block 216, talking scripts may be generated for the CSR to use in a subsequent engagement with the member.

Figure 3:
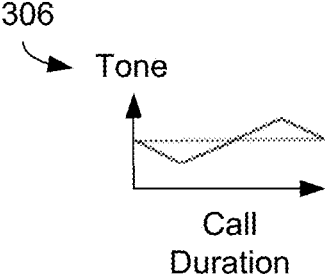
FIG. 3 is a plot diagram illustrating tone trajectory of interactions between a customer service representative and a member of the healthcare system according to one implementation.
Figure 3:
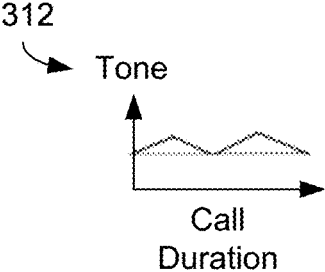

FIG. 3 illustrates plots 300 of a conversation analysis based upon a tone model 150. As illustrated in plot 306, the tone of the conversation may have taken on an undesirable tone during an initial portion of the interaction between the CSR and the member, however, as the interaction continues, the tone is determined to have improved. As illustrated in plot 312 the tone of a different conversation is illustrated as having maintained a positive or desirable tone throughout the duration of the interaction between the CSR and the member.

Figure 4:
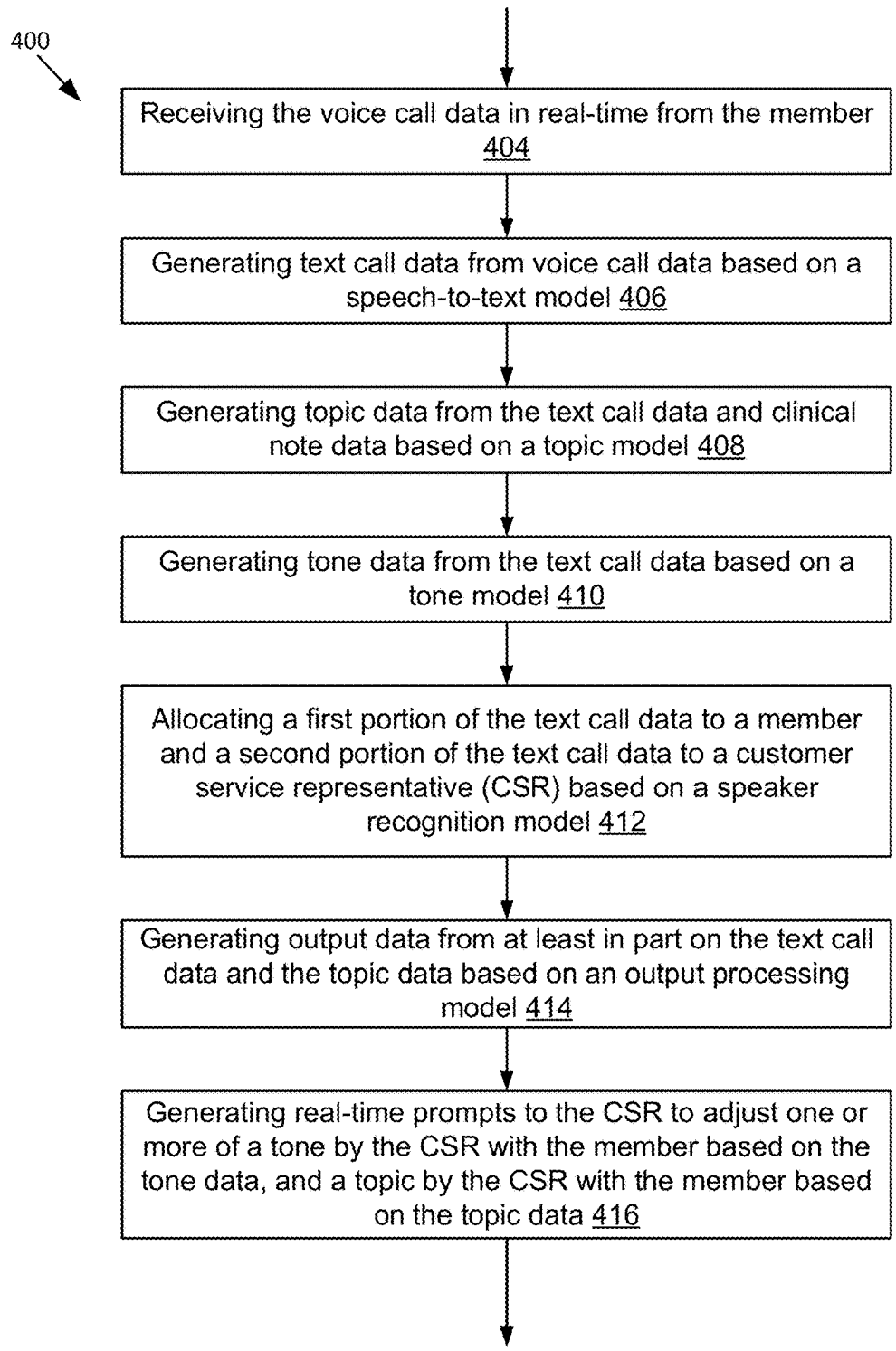
FIG. 4 illustrates a flow diagram of a second example method for improving case management of the member in a healthcare system according to some implementations.

FIG. 4 illustrates a flow diagram of a method 400 of another example for analyzing a member interaction with a CSR of the healthcare system 100. The process for evaluating an interaction between the CSR and the member begins at block 404 where the voice call data may be received in real-time from the member. The voice call data may be of a member discussing a diagnosis or treatment options with a CSR.

In a block 406, the voice call data may be used to generate text call data based on a speech-to-text recognition model 144. The speech-to-text recognition model 144 may convert audio data into readable text call data or other computer-processable data.

In a block 408, the text call data may be processed to generate topic data based on the topic detection model 146. In one aspect, clinical note data may be used to augment the text call data for the generation of the topic data. The topic data may be in the form of a diagnosis or symptoms associated with a known disease or concerns of the member expressed to the CSR in real-time. The clinical note data may be textual notes store by a CSR resulting from a previous engagement or interaction with the member.

In a block 410, the text call data may be used to generate tone data based on a tone model 150. The tone data is a representation of the sympathetic nature of the conversation between the CSR and the member. The various tones may be categorized, for example, as one or more of various feelings including anger, calmness, fear, positivity, and sadness. These various feelings may be generated based on the tone model 150.

In a block 412, the text call data may be apportioned into various portions generated by each of the speakers in an interaction. For example, the first portion of the text call data may be allocated to a member and a second portion of the text call data may be allocated to a CSR based on a speaker recognition model. Separation of the various portions of the text call data may enable separate analysis of the portions of the conversation.

In a block 414, output data may be generated, based at least in part on the text call data and the topic data based on an output processing module 190.

In another aspect at a block 416, one or more real-time prompts may be generated to the CSR to adjust one or more of a tone and topic by the CSR during the engagement with the member. A real-time prompt to adjust the tone may be based upon the tone data. If real-time prompt to adjust the topic by the CSR with the member may be based on the topic data.

Figure 5:
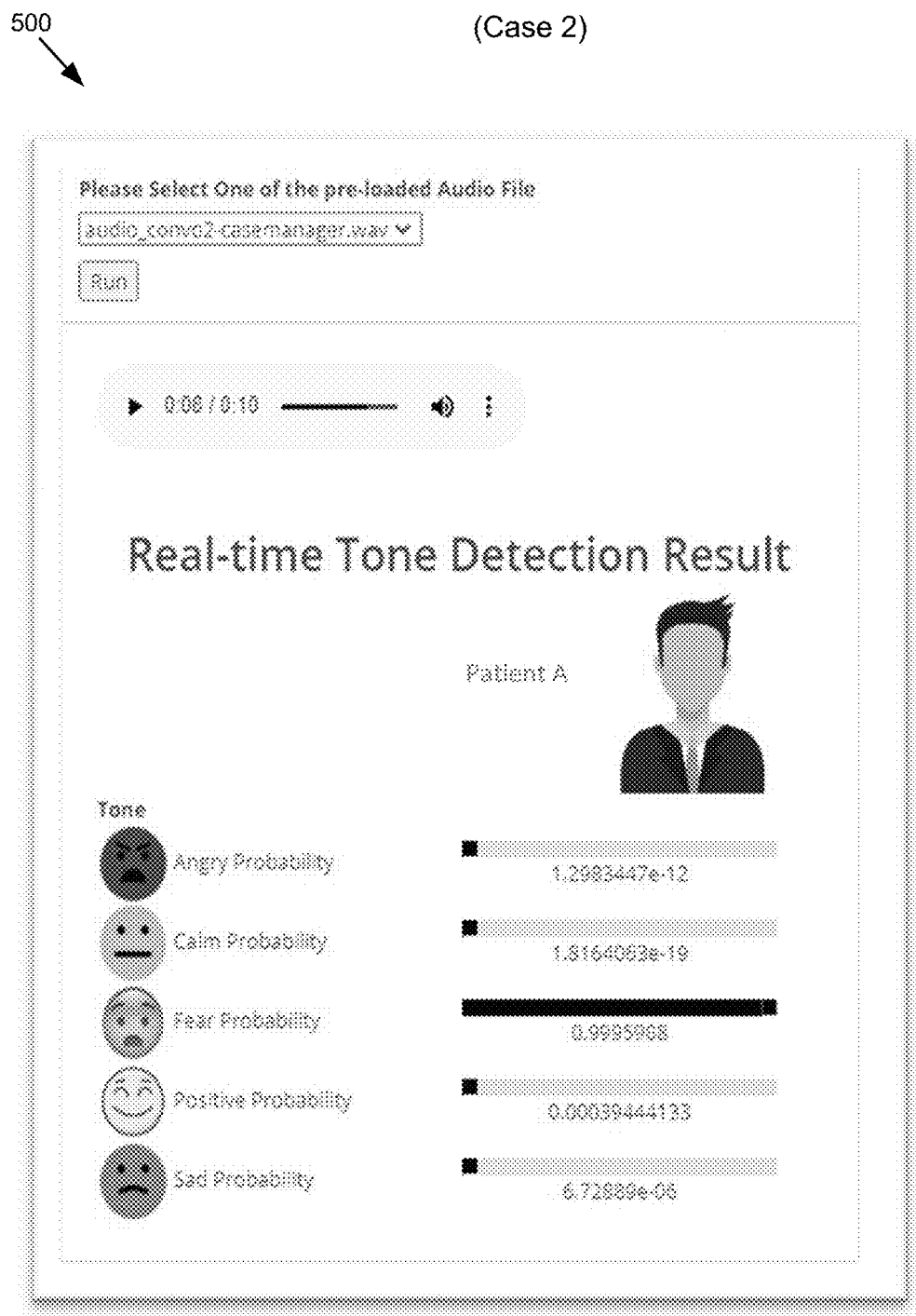
FIG. 5 illustrates a graphic representation of a display of the detected tone of a member from an interaction with a customer service representative of a healthcare system in accordance with some implementations.

FIG. 5 illustrates a display of real-time analysis of an engagement between a member and a CSR. As discussed above, output data is illustrated as corresponding to a specific member and their corresponding emotion or tone data is illustrated with respect to a specific engagement. As illustrated, an example set of tones including anger, calmness, fear, positivity, and sadness are depicted with the respective detected metrics.

Figure 6:
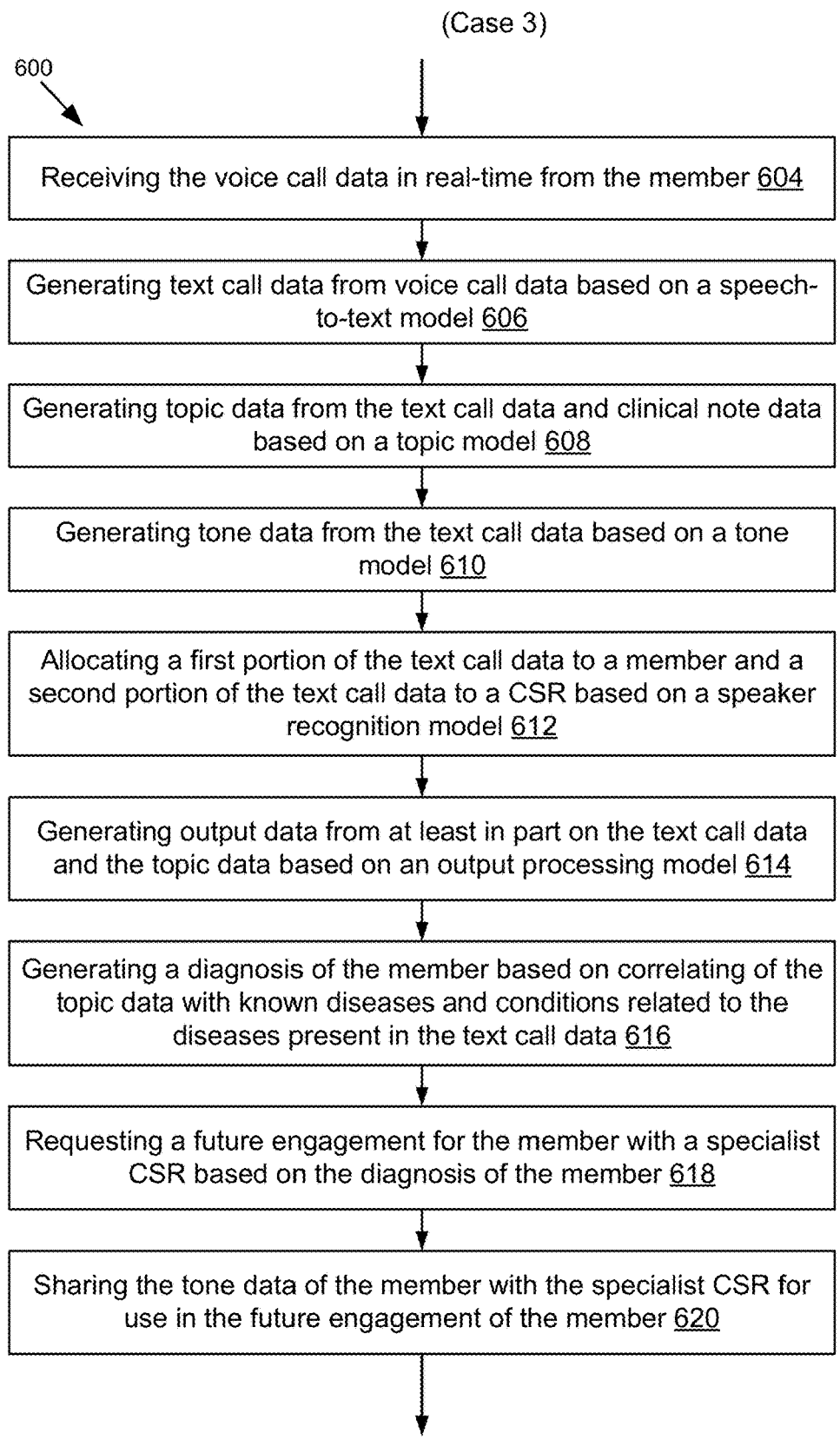
FIG. 6 illustrates a flow diagram of a third example method for improving case management of a member in a healthcare system according to some implementations.

FIG. 6 illustrates another example method 600 for analyzing a member interaction with the CSR of the healthcare system 100. The process for evaluating an interaction between the CSR and the member begins at block 604 where the voice call data may be received in real-time from the text member. The voice call data may be of a member discussing a diagnosis or treatment options with the CSR.

In a block 606, the voice call data may be used to generate text call data based on a speech-to-text recognition model 144. The speech-to-text recognition model 144 may convert audio data into readable text call data or other computer-processable data.

In a block 608, the text call data may be processed to generate topic data based on a topic detection model 146. For example, the topic detection module 146 may process the text call data. In one aspect, clinical note data may be used to augment the text call data for the generation of the topic data. The topic data may be in the form of a diagnosis or symptoms associated with a known disease or concerns of the member expressed to the CSR in real-time.

In a block 610, the text call data may be used to generate tone data based on a tone model 150. The tone data is a representation of the sympathetic nature of the conversation between the CSR and the member. The various tones may be categorized, for example, as one or more of various feelings including anger, calmness, fear, positivity, and sadness. These various feelings may be generated based on the tone model 150.

In a block 612, the text call data may be apportioned into various portions generated by each of the speakers in an interaction. For example, the first portion of the text call data may be allocated to a member and a second portion of the text call data may be allocated to a CSR based on a speaker recognition model. Separation of the various portions of the text call data may enable separate analysis of the portions of the conversation.

In a block 614, output data may be generated, based at least in part on the text call data and the topic data based on an output processing module 190.

In a block 616, a diagnosis of the member may be generated based on correlation of the topic data with known diseases and conditions related to the known disease is presented in the text call data. The generation of the diagnosis may be performed by an output processing module 190.

In a block 618, a determination may be made to request a future engagement for the member with a specialist CSR based on the diagnosis of the member. The determination for the request may be performed by the output processing module 190.

In a block 620, the tone data of the member may be shared with the specialist CSR for use in the future engagement of the member by the healthcare system 100. Use of the tone data may enable the specialist CSR to engage in or avoid specific topics that have previously led to an unfavorable engagement with the member.

Figure 7:
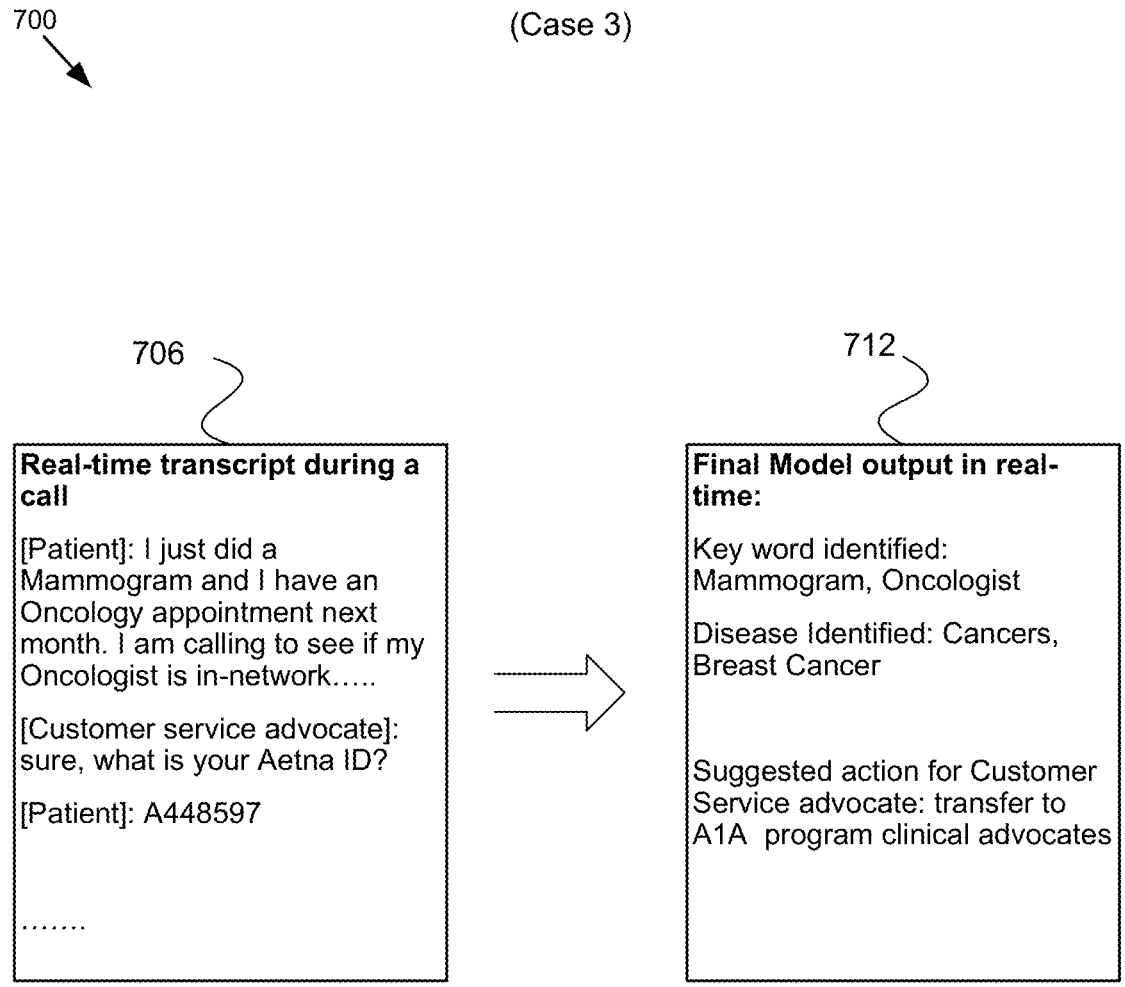
FIG. 7 illustrates example output data resulting from a dialogue between member and a customer service representative of the healthcare system.

FIG. 7 illustrates the generation of various topics based upon received voice call data. As illustrated, text call data 706 may be processed to obtain topic data 712. Specifically, text call data 706 may include various keywords that are indicative of a disease diagnosis. Accordingly, topic data 712 may include specific topics, an example of which includes "mammogram," and "oncologists" which may be used to identify diseases such as "cancers" or more specifically, for example, "breast cancer." Actions may then be suggested to direct the member for a future engagement with a specialist CSR.

Figure 8:
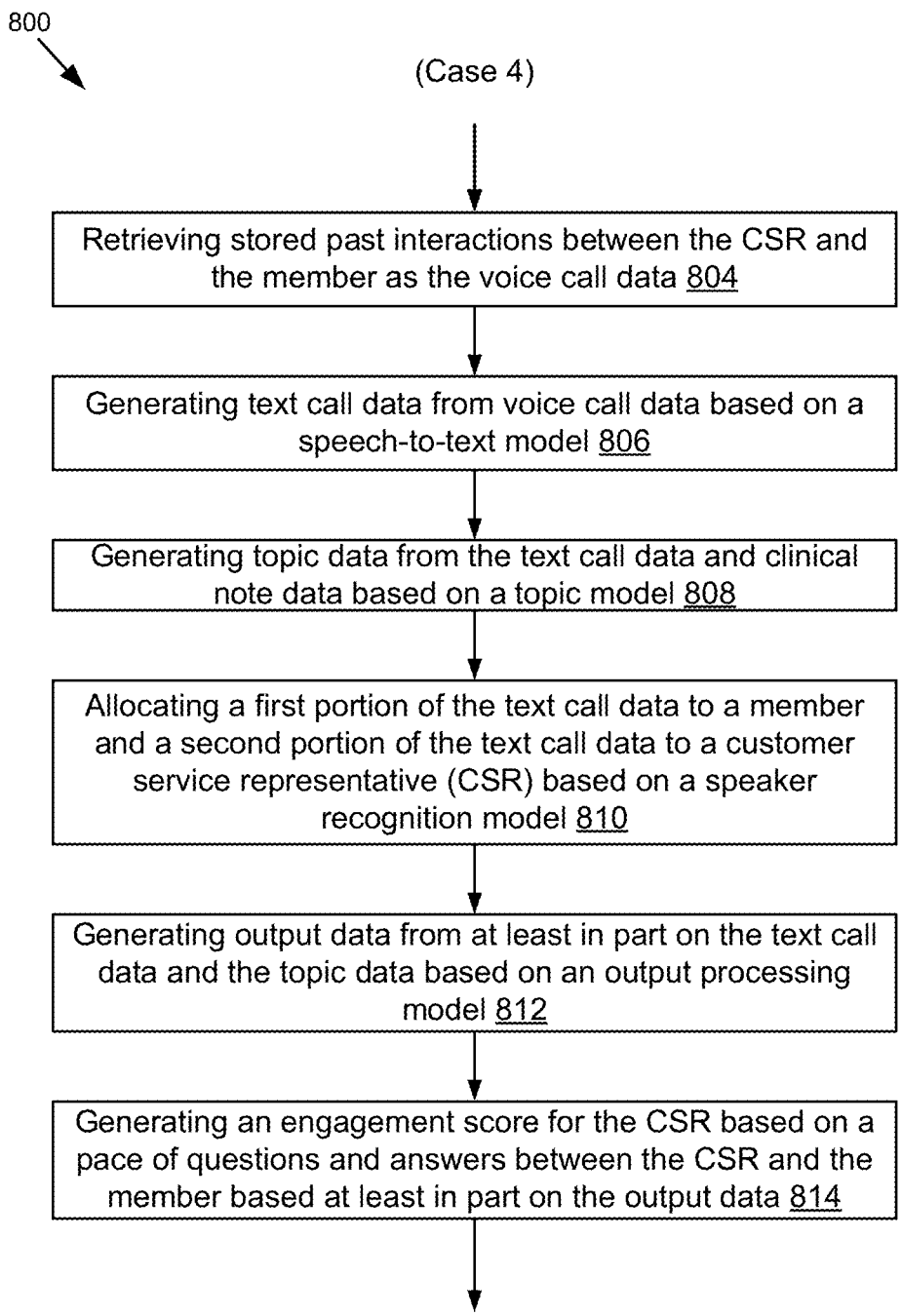
FIG. 8 illustrates a flow diagram of a fourth example method for improving case management of a member in a healthcare system according to some implementations.

FIG. 8 illustrates another example of a method 800 for analyzing a member interaction with the CSR of the healthcare system 100. The process for evaluating an interaction between the CSR and the member begins at block 804 with the stored past interactions between the CSR and the member retrieved and used as the voice call data in the process. The stored past interactions may provide a basis for analyzing past interactions to accommodate improved future interactions between the CSR and the member.

In a block 806, the voice call data may be used to generate text call data based on the speech-to-text recognition model 144. The speech-to-text recognition model 144 may convert audio data into readable text call data or other computer-processable data.

In a block 808, the text call data may be processed to generate topic data based on a topic detection model 146. In one aspect, clinical note data may be used to augment the text call data for the generation of the topic data. The topic data may be in the form of the diagnosis or symptoms associated with the known disease or concerns of the member expressed to the CSR in real-time.

In a block 810, the text call data may be apportioned into various portions generated by each of the speakers in an interaction. For example, the first portion of the text call data may be allocated to a member and a second portion of the text call data may be allocated to a CSR based on a speaker recognition model. Separation of the various portions of the text call data may enable separate analysis of the portions of the conversation.

In a block 812, output data may be generated, based at least in part on the text call data and the topic data based on an output processing module 190.

In a block 814, an engagement score may be generated for the CSR based on a pace of questions and answers between the CSR and the member which is further based at least in part on the output data. While case management of the member is effective when there is continuous support by a healthcare system, redundant questions and intentions to get multiple quick questions answered in a call may decrease the engagement of the member with the CSR. Accordingly, to improve the engagement, metrics may be generated to measure whether the CSR spent a sufficient amount of time on important topics. Further, metrics may be evaluated to determine that the questioning of the member by the CSR has an acceptable pace. Such metrics may be based on a measurement of the talking pace and a comparison of the number of sentences uttered by each of the CSR and the member.

Figure 9:
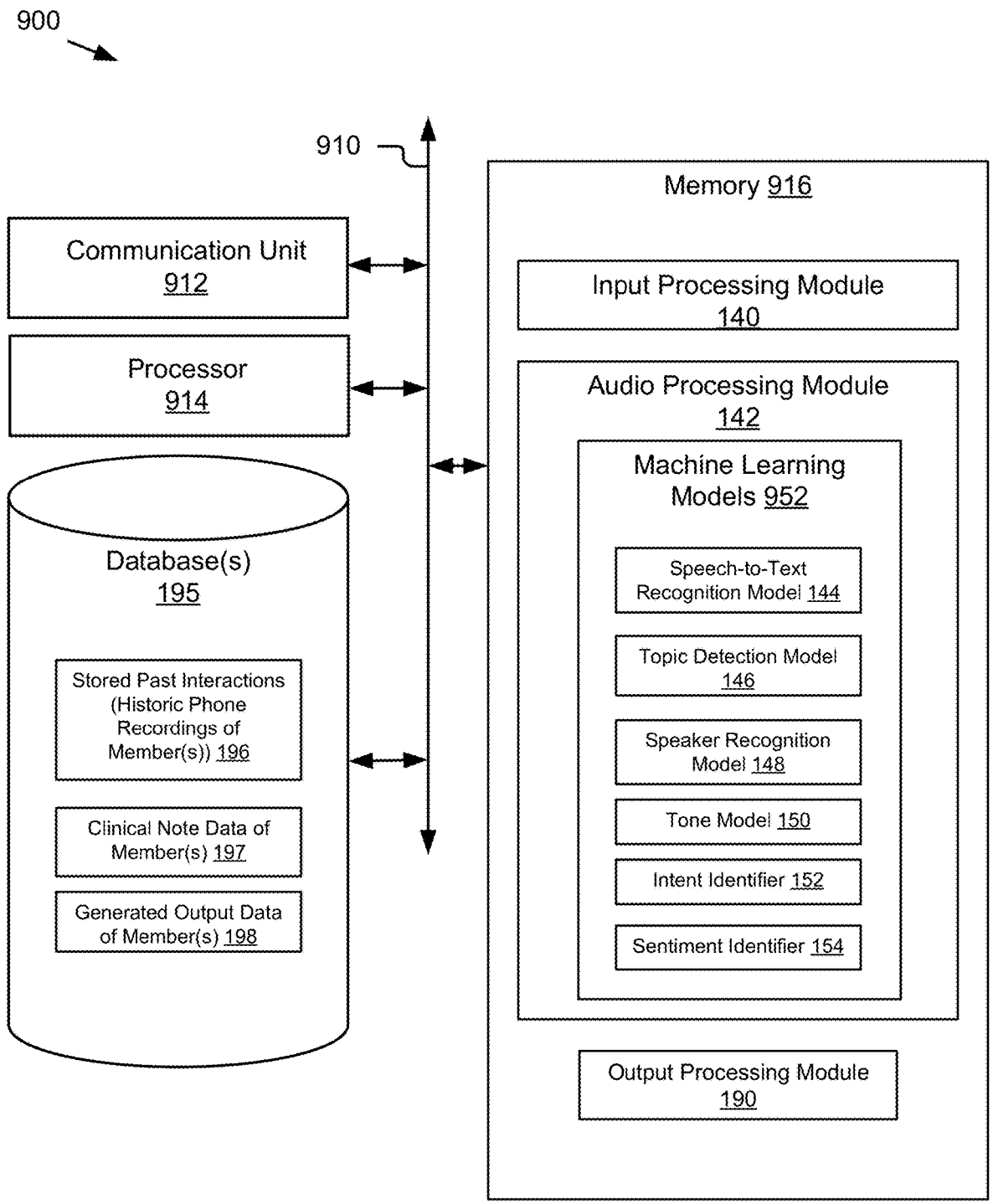
FIG. 9 illustrates a block diagram of a computing system including an input processing module, an audio processing module and an output processing module according to some implementations.

FIG. 9 shows another implementation of the case management system 138 as part of the computing device 900. The computing device 900 may be configured with an architecture and/or hardware and may incorporate elements and configurations similar to those shown in FIGS. 1-8. For example, system 900 may include selected modules and models related to providing a practical application to improve case management calls between a CSR and a member either based on stored past interactions or in a real-time interaction between the CSR and the member.

Computing device 900 may include a bus 910 interconnecting at least one communication unit 912, at least one processor 914, and at least one memory 916.

The bus 910 may include one or more conductors that permit communication among the components of system 900. The bus 910 can include a communication bus for transferring data between components of the computing device 900, a network bus system including the network 102 or portions thereof, a processor mesh, a combination thereof, etc. In some implementations, the various components of the computing device 900 cooperate and communicate via a communication mechanism included in or implemented in association with the bus 910. In some implementations, the bus 910 may be a software communication mechanism including and/or facilitating, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, communication between components of computing device 900 via bus 910 may be secure (e.g., SSH, HTTPS, etc.).

The communication unit 912 may include one or more interface devices (I/F) for wired and/or wireless connectivity among the components of the computing device 900 and the network 102. For instance, the communication unit 912 may include, but is not limited to, various types of known connectivity and interface options. The communication unit 912 may be coupled to the other components of the computing device 900 via the bus 202. The communication unit 912 can provide other connections to the network 102 and to other systems, devices and databases of the system 100 using various standard communication protocols.

The processor 914 may execute software instructions by performing various input, logical, and/or mathematical operations. The processor 914 may have various computing architectures to process data signals (e.g., CISC, RISC, etc.). The processor 914 may be physical and/or virtual, and may include a single core or plurality of processing units and/or cores. In some implementations, the processor 914 may be coupled to the memory 916 via the bus 910 to access data and instructions therefrom and store data therein. The bus 910 may couple the processor 914 to the other components of the computing device 900 including, for example, the communication unit 912, and the databases 195. The processor 914 is coupled by the communication unit 912 and the network 102 to retrieve and store information from the other components of the system 100.

System 900 may include or have access to one or more databases 960, which may correspond to database 195 described hereinabove. Database 960 may include one or more data structures or records for storing stored past interactions (e.g., historic phone recordings of member(s) 196, clinical note data 197 of member(s), and generated output data 198 of member(s)).

System 900 may include a plurality of modules or subsystems that are stored and/or instantiated in memory 916 for execution by processor 914. For example, the memory 916 may include the input processing module 140, the audio processing module 142, and the output processing module 190 configured to exchange audio and video with the CSR client 120 and the member client 104 and provide processing of the audio and video between the CSR client and the member client 104. In another aspect, the input processing module 140 may be further configured to retrieve stored past interactions between the CSR and the member as the voice call data.

The output processing module 190 may also interface with the display processing module 126 of the CSR client 120 for providing prompts, talking scripts, engagement scores, and other output data, as described hereinabove. In another aspect, the output processing module 190 may be further configured to generate an engagement score for the CSR based on a pace of questions and answers between the CSR and the member based at least in part on the output data. In yet another aspect, the output processing module 190 may be further configured, in response to the voice call data received in real-time from the member, generate real-time prompts to the CSR to adjust one or more of a tone by the CSR with the member based on the tone data, and a topic by the CSR with the member based on the topic data. The output processing module 190 includes instructions executable by the processor 914 to perform the operations described above for the output processing module 190 above with reference to FIG. 1A.

In yet a further aspect, the output processing module 190, in response to receiving the voice call data in real-time from the member, may be further configured to generate a diagnosis of the member based on correlating of the topic data with known diseases and conditions related to the known diseases present in the text call data. In yet a further aspect, the output processing module 190 may be further configured to request a future engagement for the member with a specialist CSR based on the diagnosis of the member. In yet a further aspect, the output processing module 190 may be further configured to generate a diagnosis of the member based on correlating of the topic data with known diseases and conditions related to the known diseases present in the text call data, request a future engagement for the member with a specialist CSR based on the diagnosis of the member, and share the tone data of the member with the specialist CSR for use in the future engagement of the member.

The system 900 may further include an audio processing module 142 configured to process voice call data exchanged between the CSR and the member. The audio processing module 142 may further include various machine learning models 952 for processing the voice call data. Specifically, the audio processing module 142 may include a speech-to-text recognition model 144, a topic detection model 146, a speaker recognition model 148, a tone model 150, and intent identified 152, and a sentiment identifier 154. These components 144, 146, 148, 150, 152 and 154 can be instructions executed by the processor 914 to perform functions and operations as have been described above with reference to FIG. 1B.

Figure 10:
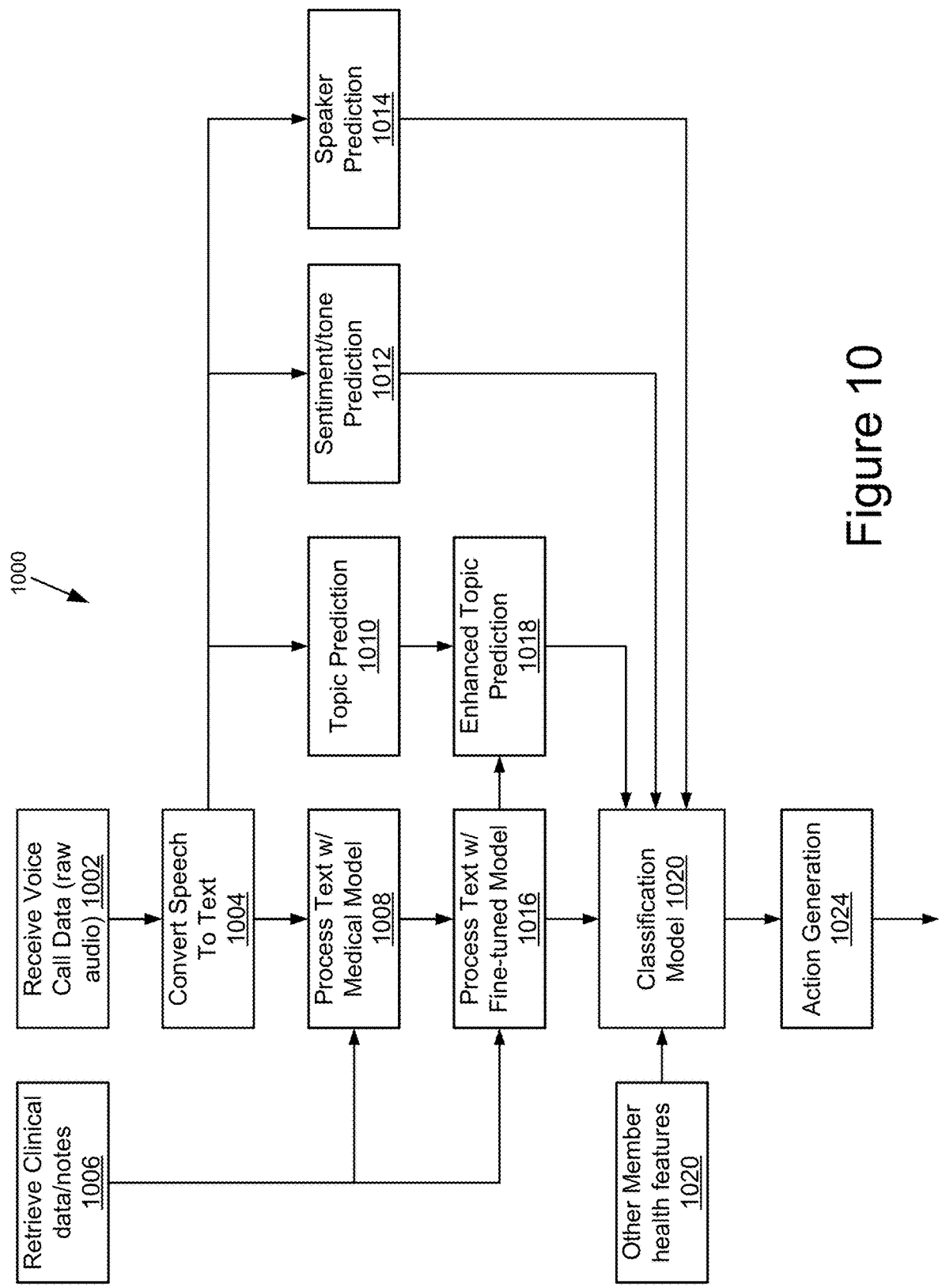
FIG. 10 illustrates a flow diagram of various combined methods for improving case management of a member in a healthcare system according to some implementations.

FIG. 10 illustrates a flow diagram 1000 of various combined methods for improving case management of a member in the healthcare system 100. The flow diagram 1000 includes combinations of some of the flow diagrams described above.

Voice data, raw audio, may be received 1002 either real time from a call between the CSR and the member, or may be retrieved from stored past interactions between the CSR and the member, as previously described. The voice call data may be converted 1004 to text call data using a speech-to-text recognition model 144. For example, this may be a data transcription process that is performed using a machine learning model, such as the speech-to-text recognition model 144 as described above. The processing/conversion of the voice call data results in the generation of text call data. The converted text, text call data, may be provided to the blocks 1008, 1010, 1012 and 1014 as shown.

The clinical data and notes are retrieved 1006 and provided for additional processing at block 1008 or 1016. In block 1008, the clinical data and text call data are to perform recognition of the text call data. In some implementations, a pre-trained language model (BERT/GPT-2-based) trained on other general information domain/medical domain (not conversational) data sets may be used. In block 1008, the text is processed for initial recognition. The output of processing by block 1008 is provided to the fine-tuned language model in block 1016.

In block 1016, the method 1000 may fine-tune the language model based on text call data and clinical notes data and may further connect with an attention layer followed by a classification layer (CRF) for use in a clinical named entity recognition task, such as a small labeled target data set. In block 1016, the method 1000 performs clinical task recognition. This fine tuning enables the model to learn the distinction between non-medical words and medical words in the data, resulting in an enhanced topic prediction in block 1018. The attention mechanism on multi-modal data further indicates which data points/samples (paragraphs, sentences) between clinical notes and call data are more important to learn from to build the fine-tuned language models, which enhance the topic models with consideration of the sequence of prior context (words/sentences) while predicting the most probable topic, thus potentially providing an enhanced approach to traditional bag-of-words-based latent Dirichlet allocation (LDA) models for appropriate topic prediction outputted. The output of processing the text with the fine-tuned model in block 1016 is provided to the enhanced topic prediction 1018 block and the classification model 1020 block as shown.

In block 1010, a topic of the interaction may be determined using a process where a topic model, such as described above with reference to the topic detection model 148 may be trained using transformer-based pre-trained language models based on other general domain/medical domain non-conversational data sets. This topic detection module 148 is used to perform initial topic determination, and performs a baseline topic detection. Next, the method 1000 enhances topic prediction 1018 by using the output from topic prediction 1010 and the output of the fine-tuned model 1016. The output of the enhanced topic prediction 1018 is provided to the classification model 1020 for further processing.

In block 1012, the method 1000 performs sentiment and tone identification by providing the text call data to a sentiment/tone prediction model. The sentiment/tone prediction model generates a predicted sentiment or tone data. This can be performed by the tone model 150 and the sentiment identifier 154, respectively, as has been described above. The predicted tone and sentiment are provided to the classification model 1020.

In block 1014, the method 1000 performs speaker identification by providing the text call data to the speaker recognition model 148. Text call data may be further used by speaker recognition model 148 and may result in the separation of the text call data into portions that are respectively attributable to a speaker which may be one of a customer service representative or members as described above. Additionally, speaker prediction 1014 may indicate who is speaking at a given time, as well as the identification of the person speaking.

The resulting topics from block 1018, the sentiment or tone from block 1012, and recognized speaker from block 1014 may be input into the classification model 1020 along with the output of block 1016, the fine-tuned language model.

Other member health features 1020 are also contemplated, an example of which may include other member health information, benefit information etc. or information from for other applications within the healthcare system. These other member health features 1020 are provided to the classification model 1020.

The method 1000 next processes the information with the classification model 1020. In some implementations, the classification model 1020 determines successful and unsuccessful calls or encounters based on a clinical impact or outcome data (including e.g., per member per month healthcare cost reduction, in-patient/emergency room visit reduction). In some implementations, the classic action module 1020 includes human input as the preferred practice when the model is being trained. The classification model 1020 generates and outputs text conversions, topics, sentiments, tone, and speaker identity for use by the output processing module 190.

The method 1000 next detects a condition and determines an action in block 1024. For example, this step may be performed by the output processing module 190, in particular, the condition detection module 191 and the automatic action module 192. In one example, the automatic action module 192 generates output data in the form of talking points or scripts generation for use by a CSR either in a current encounter or in a prospective future encounter with the member. The output data may be generated using an encoder-decoder architecture implemented with an attention mechanism where an attention layer may focus on conversations, sentences, and/or topics that elicit a better sentiment or tone in the engagement.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm may be conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "generating," processing," "computing," "calculating," "determining," "outputting," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including but not limited to keyboards, displays, pointing devices, etc.) can be coupled to the system either directly or through intervening I/O controllers.

Networks or adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web-Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method, comprising:
   receiving, using one or more processors, voice data from a call between a member and a customer service representative (CSR);
   generating, using the one or more processors, text data from the received voice data using a speech-to-text model;
   generating, using the one or more processors, a predicted topic using a topic detection model to process the text data from the speech-to-text model;
   detecting, using the one or more processors, a condition based on the text data and the predicted topic;
   generating, using the one or more processors, tone data configured to map changes in tone of the member over a duration of the call, wherein:
     generating the tone data comprises processing the text data through a tone model; and
     the tone data comprises a set of tone labels for emotional states and corresponding probability values for the set of tone labels;
   displaying, to the CSR in real-time on a display in communication with the one or more processors, the tone data indicating the changes in tone of the member; and
   identifying, using the one or more processors, an action to automatically perform based on the tone data, the detected condition, the predicted topic, and the text data, wherein identifying the action is based on the tone data indicating an undesirable tone.

2. The computer-implemented method of claim 1, wherein generating text data from the received voice data further comprises:
   applying a healthcare language model to the text data from the speech-to-text model to correct the text data based on errors in recognition of healthcare terminology; and
   applying a member profile model to the text data from the speech-to-text model to correct the text data based on error correction personalized to the member.

3. The computer-implemented method of claim 1, wherein the topic detection model comprises a series of classifiers and at least one deep learning model configured to:
   process the text data and topic labels mapped to utterances in the text data to generate a dense vector; and
   provide the dense vector to a multi-label classifier to determine the predicted topic.

4. The computer-implemented method of claim 1, further comprising:

partitioning the voice data into one or more homogeneous segments according to speaker identity using a speaker diarization model.

5. The computer-implemented method of claim 4, further comprising:
performing speaker identification on the one or more homogenous segments using a speaker recognition model trained for identifying at least the CSR.

6. The computer-implemented method of claim 1, further comprising:
training a multi-class classifier model for the tone model using customer service representative call data to map features from the voice data and the text data to the set of tone labels for generating the tone data.

7. The computer-implemented method of claim 6, wherein:
the tone data is a tone trajectory of one or more of a first portion of the text data for the member and a second portion of the text data for the CSR;
the tone trajectory is calculated using the tone model in real-time during the call; and
identifying the action to automatically perform comprises generating a talking script for the CSR configured to change the tone trajectory of the call.

8. The computer-implemented method of claim 1, further comprising:
performing intent identification by applying a deep learning model to process the voice data and the text data to generate user intent.

9. The computer-implemented method of claim 1, further comprising:
performing sentiment identification by applying a deep learning model to process the voice data and the text data to generate user sentiment.

10. The computer-implemented method of claim 1, wherein detecting the condition comprises detection of one or more of early disease risk detection, mental health conditions, neurodegenerative diseases, loss of train of thought, topic shift analysis, dementia, dementia proxy, fraudulent call or claim, social determinants of health barriers, and particular diseases.

11. The computer-implemented method of claim 1, wherein the action to automatically be performed comprises one or more of automated healthcare customer service call summarization, extractive summarization by extracting key utterances which constitute important moments of the call, vector-quantized abstractive summary, automated call center performance review, customer profiling, intelligent routing, quantifying a churn risk, proactive outreach, next best action, call auditing reports for quality assurance, performance improvement, and data consistency checks, and customer service agent review.

12. The computer-implemented method of claim 1, wherein:
the voice data is received in real-time; and
the identifying the action to automatically be performed comprises generating real-time prompts to the CSR to adjust a behavior of the CSR to be responsive to the member based on one or more of the tone data, the text data, predicted topic and the detected condition.

13. A system, comprising:
one or more processors;
a display in communication with the one or more processors; and
a memory storing instructions that, when executed, cause the one or more processors to:

receive voice data from a call between a member and a customer service representative (CSR);
generate text data from the received voice data to apply a speech-to-text model;
generate a predicted topic using a topic detection model to process the text data from the speech-to-text model;
detect a condition based on the text data and the predicted topic;
generate, using the one or more processors, tone data configured to map changes in tone of the member over a duration of the call, wherein:
generating the tone data comprises processing the text data through a tone model; and
the tone data comprises a set of tone labels for emotional states and corresponding probability values for the set of tone labels;
display, to the CSR in real-time on the display, the tone data indicating the changes in tone of the member; and
identify an action to automatically perform based on the tone data, the detected condition, the predicted topic, and the text data, wherein
identifying the action is based on the tone data indicating an undesirable tone.

14. The system of claim 13, wherein generating the text data from the received voice data further comprises:
applying a healthcare language model to the text data from the speech-to-text model to correct the text data based on errors in recognition of healthcare terminology; and
applying a member profile model to the text data from the speech-to-text model to correct the text data based on error correction personalized to the member.

15. The system of claim 13, wherein the topic detection model comprises a series of classifiers and at least one deep learning model configured to:
process the text data and topic labels mapped to utterances in the text data to generate a dense vector; and
provide the dense vector to a multi-label classifier to determine the predicted topic.

16. The system of claim 13, wherein the instructions further comprise instructions to:
partition the voice data into one or more homogeneous segments according to speaker identity using a speaker diarization model.

17. The system of claim 16, wherein the instructions further comprise instructions to:
perform speaker identification on the one or more homogenous segments using a speaker recognition model trained for identifying at least the CSR.

18. The system of claim 13, wherein the instructions further comprise instructions to:
train a multi-class classifier model for the tone model using customer service representative call data to map features from the voice data and the text data to the set of tone labels to generate the tone data.

19. The system of claim 18, wherein:
the tone data is a tone trajectory of one or more of a first portion of the text data for the member and a second portion of the text data for the CSR;
the tone trajectory is calculated using the tone model in real-time during the call; and
identifying the action to automatically perform comprises generating a talking script for the CSR configured to change the tone trajectory of the call.

20. The system of claim 13, wherein the instructions further comprise instructions to:
perform intent identification by applying a deep learning model to process the voice data and the text data to generate user intent.

21. The system of claim 13, wherein the instructions further comprise instructions to:
perform sentiment identification by applying a deep learning model to process the voice data and the text data to generate user sentiment.

22. The system of claim 13, wherein the detection of the condition comprises detection of one or more of early disease risk detection, mental health conditions, neurodegenerative diseases, loss of train of thought, topic shift analysis, dementia, dementia proxy, fraudulent call or claim, social determinants of health barriers, and particular diseases.

23. The system of claim 13, wherein the action to automatically be performed comprises one or more of automated healthcare customer service call summarization, extractive summarization by extracting key utterances which constitute important moments of the call, vector-quantized abstractive summary, automated call center performance review, customer profiling, intelligent routing, quantifying a churn risk, proactive outreach, next best action, call auditing reports for quality assurance, performance improvement, and data consistency checks, and customer service agent review.

24. The system of claim 13, wherein:
the voice data is received in real-time; and
the identification of the action to automatically be performed comprises generation of real-time prompts to the CSR to adjust a behavior of the CSR to be responsive to the member based on one or more of the tone data, the text data, predicted topic and the detected condition.

* * * * *